(12) United States Patent
Wai et al.

(10) Patent No.: US 7,161,331 B2
(45) Date of Patent: Jan. 9, 2007

(54) BOOST CONVERTER UTILIZING BI-DIRECTIONAL MAGNETIC ENERGY TRANSFER OF COUPLING INDUCTOR

(75) Inventors: Rong-Jong Wai, Liouying Township, Tainan County (TW); Rou-Yong Duan, Guosing Township, Nantou County (TW)

(73) Assignee: Yuan Ze University, Taoyuan (TW)

( * ) Notice: Subject to any disclaimer, the term of this patent is extended or adjusted under 35 U.S.C. 154(b) by 130 days.

(21) Appl. No.: 11/102,846

(22) Filed: Apr. 11, 2005

(65) Prior Publication Data

US 2006/0226816 A1 Oct. 12, 2006

(51) Int. Cl.
*G05F 1/10* (2006.01)
(52) U.S. Cl. .................. 323/222; 323/225; 323/233
(58) Field of Classification Search ........... 323/222, 323/225, 232, 233
See application file for complete search history.

(56) References Cited

U.S. PATENT DOCUMENTS 5,815,386 A * 9/1998 Gordon .................. 363/50
6,525,513 B1 * 2/2003 Zhao ..................... 323/222
7,023,186 B1 * 4/2006 Yan ...................... 323/225

* cited by examiner

*Primary Examiner*—Shawn Riley

(57) ABSTRACT

A boost converter utilizing bi-directional magnetic energy transfer of coupling inductor provides a high efficiency boost DC-DC converting with above 30 times voltage boost rate, which uses a coupling inductor and low voltage switch to absorb circuit induction voltage of a passive regenerative snubber no matter if switch is turned on or off. Such that, a much higher voltage boost rate than the turn rate of transformer and wider range of switching duty cycle is obtained. A bi-directional magnetic energy path is utilized, that is, when switch is turned on the first winding of coupling inductor stores magnetic excited high current energy, and opposite magnetic flux is induced on the second winding at the same time. When switch is turned off the magnetic excited current continues and increases the voltage on the second winding. The second winding has bi-directional magnetic current induced and fully utilizes capacity of transformer's iron core.

44 Claims, 34 Drawing Sheets

BOOST CONVERTER UTILIZING BI-DIRECTIONAL MAGNETIC ENERGY TRANSFER OF COUPLING INDUCTOR

BACKGROUND OF THE INVENTION

In many power supply applications, such as gas discharging light bulb, high-voltage DC bus of inverter in un-interrupt power supply and wide-frequency traveling wave tube amplifier etc, high-voltage DC power supplies are needed where rechargeable batteries provide power source; also, clean energy sources, such as solar power, wind power and fuel-cell battery, have relative low output voltages of DC power sources. It is necessary to have high-efficiency high voltage boost ratio DC-DC converter as front-end conversion mechanism. The present invention comprises a high voltage boost ratio converter, which utilizes bi-directional coupling induction magnetic energy transfer, such that: (1) converting traditional rechargeable battery and clean energy supply system into high-voltage DC power supply systems and substantially increasing energy efficiency and stability of power source; (2) after converting AC to DC boosting the voltage to thousand volt, or adjusting DC voltage and providing back-end power supply and improving quality of power supply. Although the present invention involves a wide range of technology fields, such as, electrical electronics, DC/DC conversion technology and energy technology, mainly deals with bi-directional magnetic energy transfer using a coupling inductor and rectifying techniques to improve current and voltage stresses exerted on components of boost converter, which affects full potential and conversion efficiency.

Traditional boost converter circuit, as shown in FIG. 1(a), utilizes duty cycle of modulating switch to boost output voltage potential. Since the voltage across the switch will equal output voltage when the switch is turned off, semi-conductor power switch with high voltage withstand has to be used; if MOSFET is used it will introduce high conduction loss because it has large conduction resistance (RDS (ON)). Furthermore, due to reverse-recovery problem in the output of diode of traditional boost converter, at the moment when switch is turned on the diode has to use spike current to establish reversed bias voltage such that this current pass through the switch causing switching loss and lower efficiency. But, since it is simple in structure and has low cost, it is been used widely, such as Power Factor Correction (PFC), when high voltage boost rate and efficiency are not concerned.

Second kind of commonly used configuration is transformer; the major advantage is separation between high and low voltage circuits. The transformer in DC-DC converter normally decreases voltage, which prevents components at low voltage side from damaged by high voltage side leakage current. Still, problems, such as, balance control of magnetic excited current and leakage current control, have to be addressed. Moreover, when used in boosting voltage, transformer configuration has many drawbacks, i.e., highest gain ratio equals only to the turn ratio of winding, output rectify diode is under twice stress of output voltage, making snubber necessary.

To boost converter, if circuit is controlled by low voltage side, it is not necessary to have circuit separation since semi-conductor switch with low specified voltage withstand is used and control circuit can control system's voltage, plus controlling switch utilizes voltage clamping technique. Non-separation boost configuration is developed where commonly used coupling inductor boost circuit, as shown in FIG. 2(b), has a character of high boost ratio of flyback design. Due to the coupling inductor is a non-separation boost configuration and primary circuit can assist in boosting voltage, it has higher boost ratio and output power than flyback circuit. However, when switch is turned off, spike voltage produced by leakage induction could damage the switch if no snubber is installed to absorb its energy, which decreases circuit efficiency.

To improve above mentioned traditional boost converter, high efficiency boost converter technologies are recommend by many experts, which can be categorized into following four types:

I. Soft Switching Technique

In reference article "A single-switch continuous-conduction-mode boost converter with reduced reverse-recovery and switching losses," by Lu et al., IEEE Transactions on Industrial Electronics, vol. 50, pp. 767–776, 2003, taking advantage of resonance between leakage of the coupling inductor and parasitic capacitance (or output capacitance), the switch is turned on when the resonant voltage is at lowest point, such avoiding diode's reverse-recovery current and reducing switching loss, plus it's simple switch configuration and efficiency will reached above 97% with low load. The drawbacks are: (1) the switch still has to endure stresses from both high and low side of voltage and current; (2) low utilization of switch's full capacity, such as TO-247 switch can output only 200 W, losing efficiency under heavy load; (3) high induction current ripples and conduction loss; (4) low boosting ratio, only 50% higher than input voltage; (5) frequency conversion making circuit complex and limiting effectiveness of soft switching under heavy load. Normal resonance circuit can be easily affected by the load and parameters of inductor and capacitor, and has large switching current ripples causing extra conduction loss. In reference article "An improved family of ZVS-PWM active-clamping DC-to-DC converters," by Duarte et al., IEEE Transactions on Power Electronics, vol. 17, pp. 1–7, 2002, its output reaches 1.6 kW and has higher conversion efficiency than previous one; but an auxiliary switch is necessary, making control circuit more complex. Soft switching has become a key in high efficiency conversion technology since it has low conduction current and output voltage difference between 400V and 300V is not quite large. In general, non-separation converter with high input voltage and low boosting ratio has low conduction loss when diode's reverse-recovery current is dealt with properly, since short switch conducting time means only energy difference between output and input being provided by the switch; in theory conversion ratio can be augmented substantially. Essentially, when dealing with soft switching the most important is, when the switch is turned on, the short current loss of switch's parasite capacitor; if does not count diode's reverse-recovery current part, switch MOSFET major part of switching loss equals to $0.5 f_s C_{oss} V_{DS}^2$, where $f_s$ is switching frequency, $v_{DS}$ is switch voltage and $C_{oss}$ is switch parasite capacitor; if both sides' voltage is lower than 50V before the switch is turned on, the percentage of switching loss in overall loss will decrease; therefore, effectiveness of soft switching to voltage manipulation is limited as to improving conversion efficiency.

II. Transformer Boost

In reference article "An improved boost PWM soft-single-switched converter with low voltage and current stresses," by Silva et al, IEEE Transactions on Industrial Electronics, vol. 48, pp. 1174–1179, 2001, by combing transformer and soft switching technique, its efficiency can reached 97.5% while boosting ratio is less than 3 times and far less than the turn ratio of winding. The stress on the switch equals to output voltage such that low voltage low conduction loss semi-conductor power switch can not be used since the transformer did not function as a separation device.

III. Coupling Inductance Configuration

In reference article "High-efficiency, high step-up DC-DC converters," by Zhao et al., IEEE Transactions on Power Electronics, vol. 18, pp. 65–73, 2003, successfully solved leakage induction energy problem and achieved goal of switch voltage clamping. Clamping capacitor is used to absorb large transient current at low voltage side and helps boosting voltage gain. Also, stress on the switch is lower than output voltage and it has highest boosting rate among aforementioned techniques; fair conversion efficiency is achieved even under the maximum power output condition, and high efficiency and boosting ratio converter becomes possible. Later, in sequent article "Novel high-efficiency step-up converter," by Tseng et al., IEEE Proceedings Electric Power Applications, vol. 151, pp. 182–190, 2004, when switch is turned on, stress on diode at high voltage side equals to reverse bias $V_O+nV_{IN}$ ($V_O$ and $V_{IN}$ are output voltage, n is turn ratio of winding), making it necessary to install snubber to eliminate spike voltage caused by leakage induction, which becomes more apparent when high output voltage and high turn ratio of winding are involved. Even though output capacitor is adjusted to secondary return route of high voltage, effectively reducing reverse bias on diode, snubber is still necessary.

IV. Secondary Side Multiple Series Boosting

In reference article "Isolated DC-DC converters with high-output voltage for TWTA telecommunication satellite applications," by Barbi et al., IEEE Transactions on Power Electronics, vol. 18, pp. 975–984, 2003, single or two step configuration, soft switching and transformer boosting are all combined to obtain high voltage gain. After the secondary of transformer is rectified, multiple winding are connected in series to attain 3.2 kV high voltage output, which primarily used as power source for satellite telecommunication, similar to Tseng et al design. Because of the character of soft switching, which effectively resolved high voltage side reverse-recovery current on the diode, conversion efficiency is very high; when input voltage is at 26V–44V, supply 150 W to a load, lowest efficiency is 94.1% and it is a classical among boosting technologies. Detail analysis reveals that 3.2 kV is achieved by using multiple winding voltage connected in series; if single winding used the highest output voltage is only 750V. Major components include four switches, three inductors and one transformer. The highest voltage measured on auxiliary switch is 150V while a 250V–23 A switch is chosen; the highest voltage measured on main switch is 120V while a 200V–100 A switch is chosen. All the switches are TO-247 with output power only 150 W, where their full capacity is not utilized, since efficiency is the primary concern in satellite telecommunication.

Referring to the all above mentioned technologies and other coupling inductor configurations, voltage waveforms on switch are as shown in FIG. 15 referred to Lu et al or FIG. 19 referred to Tseng et al. measured on MOSFET switch, where spike voltage occurs at the turn-off instant and is 50% higher than normal voltage across switch forcing higher voltage withstand switch to be used and may be higher than output voltage. To MOSFET $R_{DS(ON)}$ increases proportionally far higher than voltage increase; generally speaking, conduction loss for MOSFET is proportional to the square of the output current and conduction loss for high voltage MOSFET under heavy load will be higher than that for IGBT semi-conductor power switch, which is where attention being paid by researchers. The switch spike voltage presented in Lu et al. and Tseng et al. is induced by instant current change from circuit and components' internal induction current when primary coupling inductor is shut off. To solve the problem a snubber is connected to the switch in parallel and shorter the path the better it is; the path must have low skin effect and mutual resonance as to effectively using lower voltage, low conduction loss switch; for high efficiency high boost ratio equipment, voltage clamping technique is, such, much more important than soft switching technique. Additionally, although above-mentioned coupling circuit has eliminated the impact of leakage induction, they did not further resolve the problem of voltage clamping at high voltage side of diode. Also, the iron core is not fully utilized since secondary winding has only single direction current.

In summary, the drawbacks of above boost converter technologies are: (1) resonance circuit applies to the configuration of high input voltage; (2) switch capacity is not fully utilized; (3) voltage clamping can't be achieved on both high and low voltage sides at the same time; (4) magnetic excited current and induction current of transformer are not fully utilized; (5) conversion rate can't be increased substantially; (6) there is not any configurations can achieve high efficiency and high boosting rate at the same time; (7) configuration and control are complex.

BRIEF SUMMARY OF THE INVENTION

The present invention is to solve those problems mentioned above to achieve high efficiency high boost ratio converter, under the condition of the same turn ratio of winding and duty cycle conduction; the advantages are as follows:

1. High output voltage boost ratio is achieved while only low turn ratio of winding for coupling inductor and lenient duty cycles are needed. If the turn ratio of winding is too high, the primary and secondary winding can't be compacted tightly and coupling coefficient will decreases, which reduces output voltage; second, when the switch is turned on, reverse bias voltage on secondary winding is proportional to DC input voltage multiplying the turn ratio of winding such that rectifying diodes have to bear this voltage plus output circuit's high voltage. Increasing the turn ratio of winding can obtain relative low switch clamping voltage and lenient duty cycle control while endurance of the diode at high voltage side can not be solved easily, specially, when switching spike voltage from high voltage side winding; furthermore, if duty cycle is too low induction current will be in non-continuous form and increases of ripples making current into see-saw waveforms, for example, since MOSFET switch conduction loss is proportional to the square of the current, under the same supplied power, see-saw current waveforms make higher switch loss than square waveforms. When duty cycle is close to one conduction loss is improved, but the diode at high voltage side has to endure the force of voltage and current. First, since only a few moments to transfer all the energy, the diode has to endure large transient current; second, because above mentioned spike voltage problem, the switching duty cycle is too high, and the diode's capacity has to be increased such that the loss increases too. In a nutshell, increasing the turn ratio of winding to gain high boost rate is not ideal.

2. Passive regenerative snubber can absorb circuit induction energy, which makes wire laying and production easy. Common used snubber can be divided into three types: passive (consisting of capacitor, resistor and diode), active (auxiliary switch, capacitor and diode) and passive regenerative (capacitor and diode) and is mainly to absorb the energy caused by induction voltage (affecting voltage clamping) and reverse-recovery current on the diode. The energy in the capacitor of the passive snubber is consumed completely by the resistor, therefore it has lowest efficiency. The active snubber requires additional switch and control circuit, other than internal circular current has to be addressed. The passive regenerative snubber first absorbs the energy affecting clamping voltage, and then transfer the energy to output terminal using original circuit; it requires lest components and increases a little in switching loss to build an auxiliary boosting circuit, as well has highest efficiency. The spike voltage is primarily caused by high frequency of switching. Because power equals to voltage multiplying current, when current is very high at a low voltage DC power source, spike voltage can be induced by a little distributed inductance, which comes from improper wire layout, inner induction of wire and components. To protect switch from being damaged by the spike voltage, a high capacity capacitor can be installed in parallel to the switch to clamp the voltage; in addition, spike current is quickly passed to passive regenerative snubber and there no high charging current and no ripple voltage left such that both suppressions are achieved and clamping will not be affected even large circuit inductance exists. Having a high current and low induction wiring layout can be a challenge in practice, and present circuit effectively reduces induction between wires.

3. The energy absorbed by the capacitor in passive regenerative snubber is applied to boost output voltage, and no circular current exists which further helps clamping voltage. The present invention not only transfers the energy from snubber to the output terminals, but also inserts voltage clamping in the process, further reducing voltage exerted on the switch and providing a key structure for bi-directional current return route on secondary winding side.

4. The voltage exerted on the switch is not related to input voltage, and it is suitable to DC-DC converters with wide range of voltage requirements. Using equation deduction and lab experiments, the present invention proves that voltage exerted on the switch depends on output voltage and turn ratio of winding; under variety voltage and loads, highest voltage exerted is about 55V; it is not necessary to be concerned during input voltage and duty cycle vary since the voltage on the switch is not related to input voltage and duty cycle. Certainly, the necessary condition is that input voltage cannot be higher than that switch can bear.

5. All the diodes can function in clamping voltage, and there are no problem as to short circuit current and high reverse-recovery current. The discharge diode of passive regenerative snubber connects to the clamping capacitor and filter circuit, and when reverse voltage is higher than the difference between the output voltage and the voltage on the clamping capacitor, rectify diode in the filter circuit is turned on; therefore, voltage beard is lower than the output voltage and there is no need for additional snubber. The lower the voltage withstands, the lower the conduction loss for the diode. When the reverse voltage is higher than the difference between the output voltage and the voltage on clamping capacitor, diode used in the filter circuit and discharging diode used in the passive regenerative snubber are open so that voltage exerted on is lower than the output voltage and no additional snubber is needed; since the two diodes compensate each other for opening, reverse-recovery current is low, and clamping function is achieved satisfactorily.

6. High conversion ratio. The present invention uses a non-separation configuration and pays close attention to the characters of low voltage large current and high voltage small current, as well low current ripples. When conducting cycle is at 50%, under the same output power, switch current will attain lowest effective value and form highest efficient region. Such, lower voltage and current components can be chosen to reduce costs and make high efficiency converter.

7. Simple configuration. The present invention uses only two more diodes and two more capacitors than traditional coupling inductor circuit and has much higher boost ratio, specifically, due to bi-directional energy transferring and voltage of passive regenerative snubber being used.

8. The capacity of coupling inductor is smaller than traditionally used circuit. Coupling inductor has the same character as transformer, where once current pass primary winding there will be output current in secondary winding. According to analysis of idealized transformer, energy transferred to secondary winding makes magnetic flux equals to zero in iron core and does not increase any load on iron core's magnetic flux. The magnetic excited current in primary winding will pass onto secondary winding when semi-conductor power switch is turned off according to flyback transformer theory; the current in the secondary winding then charges filter circuit in reverse at a much lower current. Normally to produce low ripple charging current, transformer must have high induction value, while low induction design by the present invention means substantially decreasing current ripples in semi-conductor power switch and reducing required iron core's capacity.

9. Relative low transformer copper loss. The configuration of the present invention allows high ripples in magnetic excited current and low magnetic excited coupling induction, which requires less turns of primary winding where large current pass through, reducing copper loss generated by surface skin effects and magnetic excited loss.

10. Easy to handle magnetic interference. Rapidly changing current is limited to primary circuit, making it easy to handle magnetic interference.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

Following drawings with reference numbers and exemplary embodiments are referenced for explanation purpose.

FIGS. 2(a) and 1(b) are traditionally used boost converter and coupling inductor boost converter respectively.

FIGS. 11(a)~1(f) is the switch voltage and current waveforms of the present invention when DC output load is fixed at 100 W, DC input voltage boosted from 9~30V to 400V.

DETAILED DESCRIPTION OF THE PREFERRED EMBODIMENTS

Figure 1:
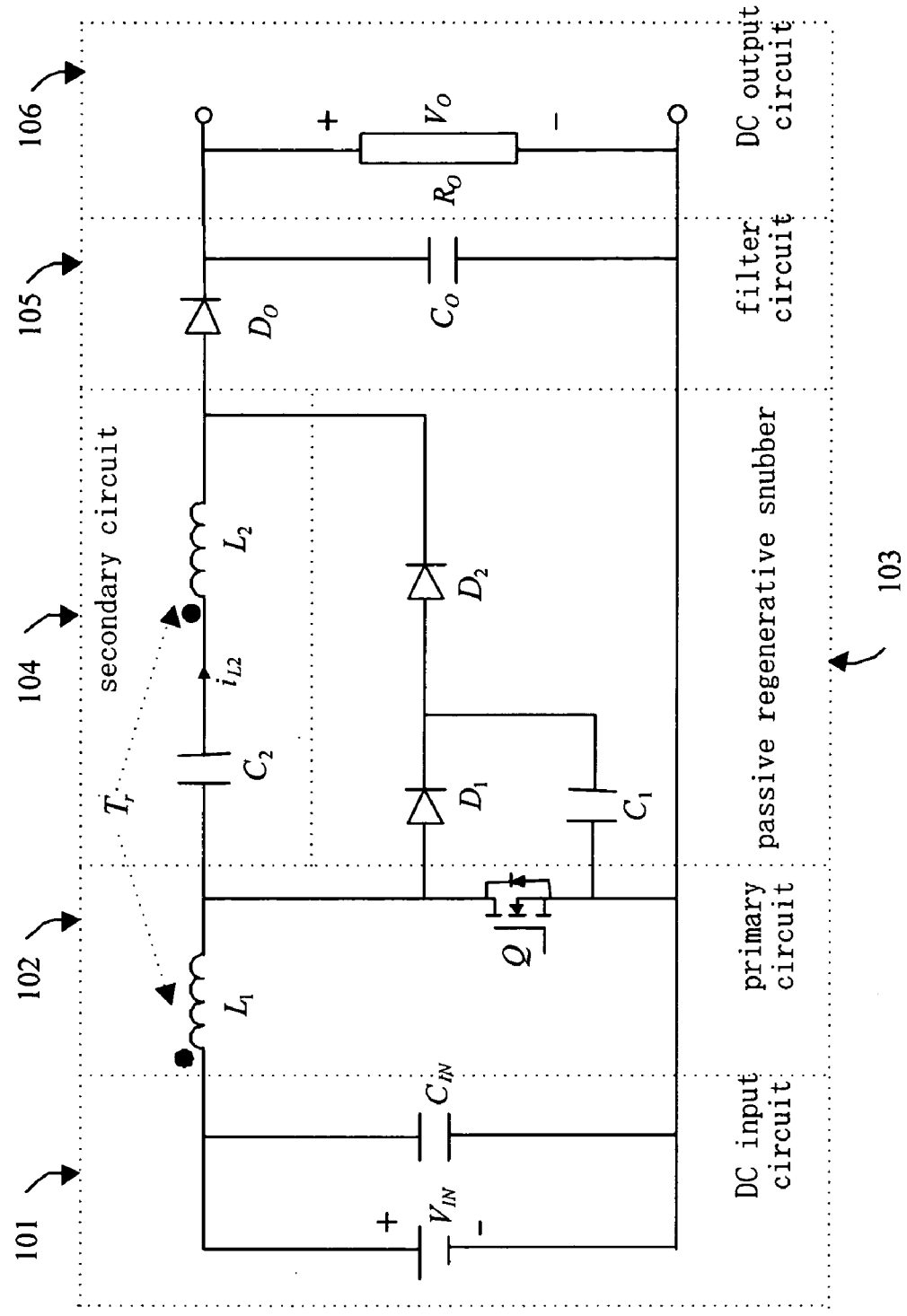
FIG. 1 is the diagram of the first preferred embodiment of the present invention.

The first preferred embodiment of the present invention is shown in FIG. 1. DC voltage $V_{IN}$ of DC input current circuit 101 stores energy in primary winding $L_1$ of coupling inductor $T_r$ when semi-conductor power switch Q of primary circuit 102 is turned on; at the same time, because bi-directional current path of secondary winding $L_2$ of the coupling inductor $T_r$ of secondary circuit 104, its induction voltage $v_{L2}$ (polar point is positive at the moment) plus the voltage of clamping capacitor $C_1$ of passive regenerative snubber 103 charge the high voltage capacitor $C_2$ (charging current is $-i_{L2}$) of secondary circuit 104 through semi-conductor power switch Q and discharge diode $D_2$ route. At the instant when semi-conductor power switch Q is turned off, the current from primary circuit 102 leaves semi-conductor power switch Q, through the clamping diode $D_1$ of passive regenerative snubber 103, into its clamping capacitor $C_1$. According to the theorem that magnetic flux does not extinguish, after primary winding's magnetic excited current reverses secondary current to $i_{L2}$, the rectifying diode $D_O$ of filtering circuit 105 injects energy from secondary winding $L_2$ of coupling inductor $T_r$ into its filtering capacitor $D_O$ and attains stable DC voltage $V_O$. DC output circuit 106 connects load $R_O$ to the converter.

Figure 3:
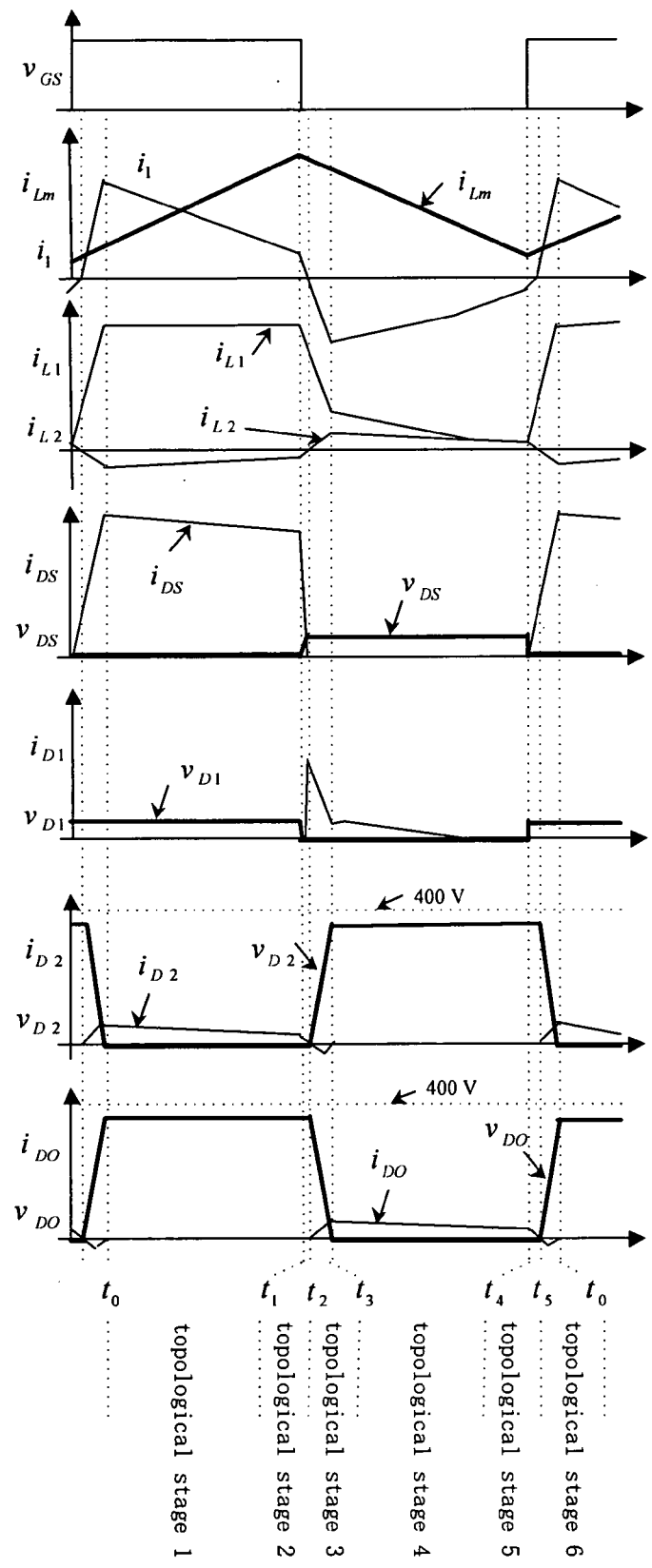
FIG. 3 is the circuit signal phases of the present invention.
Figure 4:
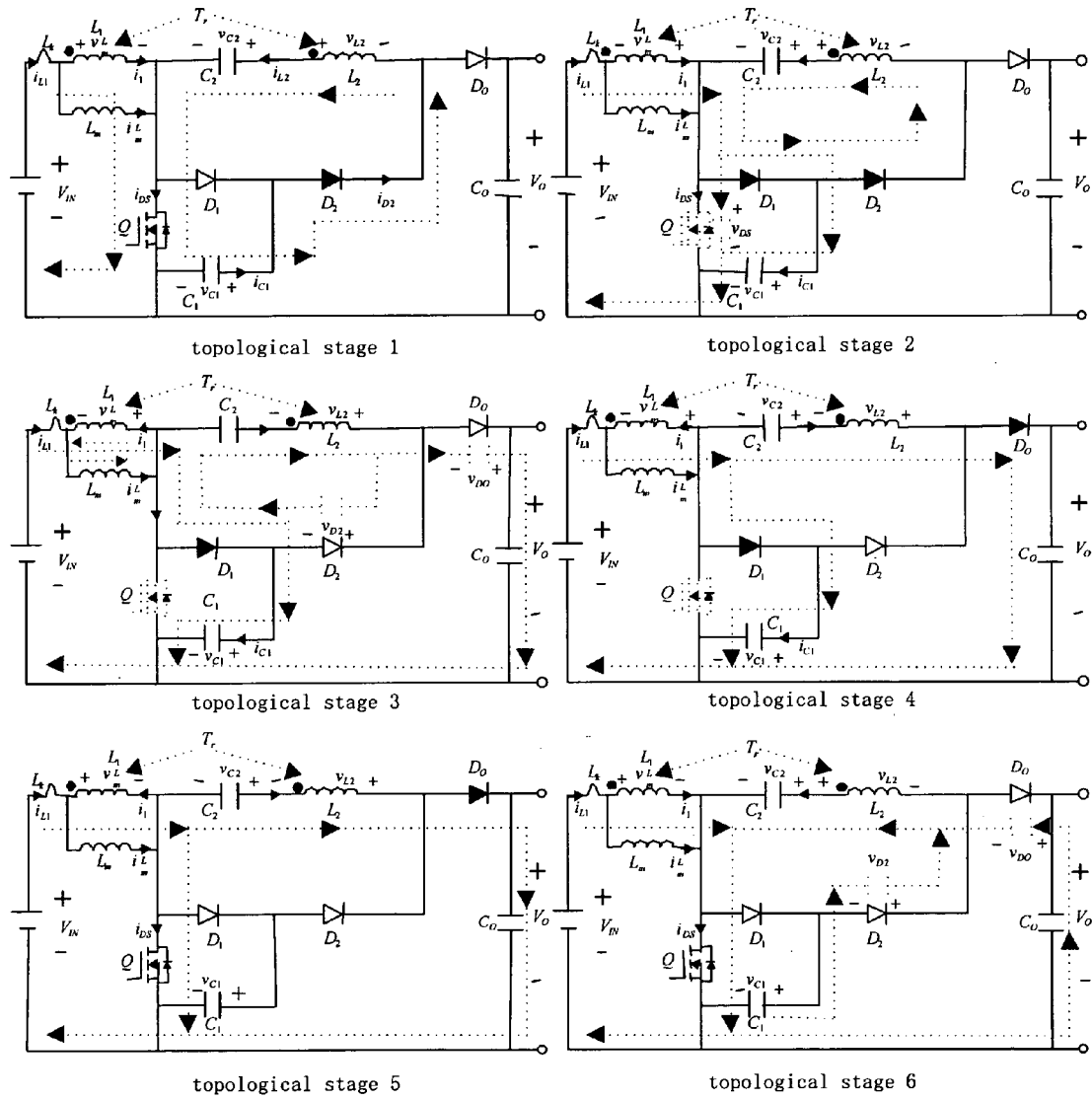
FIG. 4. is the six topological stages of the circuit.

The signal phases and topological stages of the present invention are shown in FIG. 3 and FIG. 4. Referring to FIG. 3 and FIG. 4, detailed explanation of working principle is presented in the following, and to make it simple, all the explanation is accorded with FIG. 4 except in FIG. 3 positive end of polar point is defined as where the current $i_{L2}$ flows in. Also circuit numbers (such as circuit 101) are omitted and it will be clear as long as the right diagram is referred:

Topological Stage 1: Time $(t_0-t_1)$; Switch Q is Turned on for a While

The current $i_{L1}$ of primary winding $L_1$ of coupling inductor $T_r$ consists of primary induction current $i_1$ and magnetic excited current $i_{Lm}$. The primary induction current $i_1$ comes from ideal transformer coupling to secondary induction current $i_{L2}$ of secondary winding $L_2$, and magnetic excited current $i_{Lm}$ is produced by magnetic excited induction $L_m$, mainly for storing energy when the switch Q is turned on, and then transfer the energy to secondary winding $L_2$ when switch is turn off. At the moment, all three current $i_1$, $i_{Lm}$ and $i_{L2}$ pass through the switch Q, where induction polar point of secondary winding $L_2$ has a positive voltage, adding the voltage $v_{C1}$ of clamping capacitor $C_1$ of passive regenerative snubber, charge high voltage capacitor $C_2$ through switch Q and discharging diode $D_2$; this passage is the key technology in making bi-directional magnetic energy transferring possible.

During this time, the current $i_{DS}$ of switch Q equals to $i_1+i_{Lm}+i_{L2}$, since magnetic excited current $i_{Lm}$ is induction storage energy, the current increases gradually forming a positive slop; at the instant when the switch is turned on, charging current $i_{L2}$ of high voltage capacitor $C_2$ of secondary circuit reaches to its peak, and then decreases while the capacitor's voltage rises; the current $i_{L2}$ is generated by primary winding's induction current $i_1$ and amplified in proportion to the turn ratio of winding, the slop of waveforms of the current $i_1$ is negative; such, the current $i_{L1}$ of primary winding $L_1$ is $i_1$ plus $i_{Lm}$, which compensates each other making the current $i_{L1}$ close to square wave; in the same way, previous one plus induction current $i_{L2}$ of secondary winding (high voltage small current) equals to the current $i_{DS}$ of the switch and is also close to square waveforms. The square waveforms of the current represent two points: first, ripples portion in the current through the switch Q is low; since switch's conduction loss equals to square of the current, assuming under the same average current, square sum of rectangular waveforms current is smaller than square sum of triangle waveforms current, the conduction loss of the switch Q caused by rectangular waveforms current is much smaller than that by triangle waveforms current. Second, the slops of current $i_1$ and $i_{Lm}$ are opposite, lower magnetic excited induction $L_m$ is acceptable, the number of turns of primary winding $L_1$ of coupling inductor $T_r$ and the capacity of iron core all can be reduced substantially; copper loss and iron core loss caused by primary winding high current will decrease simultaneously.

Topological Stage 2: Time $(t_1-t_2)$; the Instant when the Trigger Signal of Switch Q is Turned Off At the instant when the trigger signal of the switch Q is turned off, the current $i_{L1}$ and $i_{L2}$ of primary and secondary winding of the coupling inductor first charge parasite capacitor of semi-conductor power switch Q. When the voltage $v_{ps}$ across the switch Q is higher than the voltage $v_{C1}$ of the clamping capacitor, the clamping diode $D_1$ is turned on and charges the clamping capacitor $C_1$ absorbing the energy released by leakage induction $L_k$ of primary winding $L_1$. The current $i_{L2}$ of secondary circuit has to pass through the clamping diode $D_1$ and rectifying diode $D_2$ to release the energy stored in secondary winding $L_2$ of the coupling inductor $T_r$, which is absorbed by the high voltage capacitor $C_2$. The clamping capacitor $C_1$ is a high capacity one, having excellent high frequency response in order to quickly guide the current $i_{DS}$ of the switch Q to itself; the voltage $v_{C1}$ can be viewed as stable low ripples DC voltage to ensure switch's voltage to the maximum. In addition, the clamping diode must open quickly and it has the same requirement as the switch Q on voltage withstand, such that Schottky diode could be the best choice because of its low power consumption and low conducting voltage.

Topological Stage 3: Time $(t_2-t_3)$; the Current $i_{L2}$ of Secondary Winding Reverses its Direction After leakage induction energy of secondary winding $L_2$ is released, the current $i_{L2}$ decreases to zero at time $t_2$, the magnetic excited current $i_{Lm}$ of primary winding releases the energy and couples to the current $i_{L2}$ of secondary winding, which will gradually increase and flow out of non-polar point. The current $i_{L2}$ of secondary winding applies cut-off needed reverse-recovery current to discharge diode $D_2$, to establish reverse bias $v_{D2}$ which forces reverse parasite capacitor $v_{DO}$ of rectify diode of filter circuit gradually release to zero. The sum of the current $D_2$ and $D_O$ of two diodes equal to the current of secondary winding, at the same time since leakage induction of secondary winding $L_2$ will limit change rate of the current and the current of secondary circuit must be small, the current of reverse-recovery and positive passing current will be small. In addition, since two diodes $D_2$ and $D_O$ connected in series across filter capacitor $C_O$ of filter circuit and clamping capacitor $C_1$, the sum of the two voltage equals to the output voltage $V_O$ minus the voltage $v_{C1}$ of clamping capacitor $C_1$, having the effect of voltage clamping; the diodes voltage withstand is lower than output voltage, and when specified output voltage is below 200V, Schottky diode can be used directly.

Topological Stage 4: Time $(t_3-t_4)$; Energy is Transferred to Output Terminal

When rectify diode $D_O$ of filter circuit is on at the time its reverse parasite voltage releases to zero $(t=t_3)$, discharge diode $D_2$ is off. The DC source voltage $V_{IN}$, the voltage $v_{L1}$ produced by magnetic excited current $i_{Lm}$ of primary winding, the voltage $v_{L2}$ of secondary winding $L_2$ and the capacitor high voltage $v_{C2}$ of secondary circuit, are all connected in series to charge the filter capacitor $C_O$ with a low current and supply to DC output circuit load $R_O$. According to the theorem that magnetic flux does not extinguish, after leakage induction energy is exhausted, coupling inductor $T_r$ continues providing current to the primary and secondary circuit for a while, that is, charging the clamping capacitor $C_1$ and to secondary current, also releasing current to the secondary filter circuit and DC output circuit. During Topological stage 4, due to decreasing voltage $v_{C2}$ of the high voltage capacitor $C_2$ with continuous discharge and the increasing voltage $v_{C1}$ of the clamping capacitor $C_1$ with continuous discharge, reverse bias of the clamping diode $D_1$ is cut off. At this moment, the current $i_{L1}$ of primary winding equals to the current $i_{L2}$ of secondary winding.

Topological Stage 5: Time $(t_4-t_5)$, the Instant When the Switch Q is Turned On At the instant $(t=t_4)$ when the switch Q is turned on, since the clamping diode $D_1$ is a low voltage Schottky diode, it becomes reverse bias instantly. The leakage induction $L_k$ of primary winding of coupling inductor $T_r$ limits the rise of the current $i_{L1}$, while the current $i_{L2}$ to leakage induction of the secondary winding needs time to decrease to zero, the two leakage current control each other, plus reverse bias of the clamping diode $D_1$ has no reverse-recovery current, the switch can't obtain any current from primary circuit, secondary circuit and the clamping diode $D_1$, which naturally forms zero current switch (ZCS). At this time, circuit current continues maintaining output flowing direction, but gradually decreasing, such that the p Topological Stage 6: Time $(t_5-t_o)$: the Current $i_{L2}$ of Secondary Winding Reverses Direction After leakage induction energy releases $(t=t_5)$, the current $i_{L2}$ of secondary winding reverses direction and flow into switch Q, applying reserve-recovery current to the rectify diode $D_O$ of filter circuit with small current and making the discharge diode $D_2$ turning on. At the instant when the discharge diode $D_2$ turns on $t=t_0$, a switching cycle is completed. Afterwards, repeats starting from step 1.

[Equation Deduction]

Let turn ratio of primary winding $L_1$ and second winding $L_2$ of the coupling inductor $T_r$ be $n=N_2/N_1$, coupling coefficient k is defined as:

$$k=L_m/(L_k+L_m) \quad (1)$$

Where $L_m$ is magnetic excited induction (or mutual induction), $L_k$ is leakage induction of primary winding.

When the semi-conductor power switch Q is turned on, equivalent voltage $v_{Lm}$ of the magnetic excited induction $L_m$ of primary winding is:

$$v_{Lm}=kV_{IN} \quad (2)$$

The inducting voltage $v_{L2}$ of secondary winding $L_2$, which is positive at polar point, is:

$$v_{L2}=nv_{L1}=nkV_{IN} \quad (3)$$

At this time, the inducting voltage $v_{L2}$ of secondary winding connects to the voltage $v_{C1}$ of clamping capacitor $C_1$ of passive regenerative snubber in series, charging high voltage capacitor $C_2$ of secondary circuit; the voltage $v_{C2}$ of the high voltage capacitor $C_2$ is:

$$v_{C2}=nkV_{IN}+v_{C1} \quad (4)$$

When the switch Q is turned off, the leakage induction $L_k$ of primary circuit continues flowing into the clamping capacitor $C_1$ of passive regenerative snubber until secondary current responses to the energy of magnetic excited induction $L_m$, according to theorem of balance voltage of leakage induction $L_k$ of primary winding, its cycle $D_L$ [4] is:

$$D_L=t_L/T_S=2(1-D)/(n+1)t_L=t_3-t_1 \quad (5)$$

Where $T_s$ is the switch's switching cycle, D is the switch's duty cycle, $t_L$ is the sum of the topological step 2 time and the topological step 3 time. In other words, it is the time needed by the leakage induction $L_k$ of primary winding to release its energy, therefore the voltage $v_{Lk}$ of the leakage induction $L_k$ (the point near the switch Q is positive) is:

$$v_{Lk} = \frac{D(n+1)(1-k)}{2(1-D)} V_{IN} \quad (6)$$

The voltage $v_{Lm}$ of magnetic excited induction $L_m$ (the point near the switch Q is positive) is:

$$v_{Lm}=DkV_{IN}/(1-D) \quad (7)$$

Therefore the voltage $v_{C1}$ of the clamping capacitor $Cd_1$ can be expressed as:

$$v_{C1} = v_{Lk} + v_{Lm} + V_{IN} \qquad (8)$$
$$= \frac{V_{IN}}{1-D} + \frac{D(1-k)(n-1)}{2(1-D)} V_{IN}$$
$$= v_{DS}$$

At the same time, the voltage $v_{C1}$ is the voltage the switch bears. Therefore the equation (4) can be rewritten to:

$$v_{C2} = \left[ nk + \frac{2 + D(1-k)(n-1)}{2(1-D)} \right] V_{IN} \qquad (9)$$

When the switch is turned off, the voltage of secondary winding $L_2$ of coupling inductor $T_r$, which is positive at non-polar point, is:

$$v_{L2} = n v_{Lm} = DknV_{IN}/(1-D) \qquad (10)$$

At this moment, the all three voltages $v_{C1}$, $v_{C2}$ and $v_{L2}$ discharge to filter capacitor $C_O$ and load $R_O$, the output DC voltage $V_O$ is:

$$V_O = v_{C1} + v_{C2} + v_{L2} \qquad (11)$$
$$= \frac{2 + nk}{1-D} V_{IN} + \frac{D(1-k)(n-1)}{1-D} V_{IN}$$

Therefore, converter's gain can be expressed as:

$$G_{V1} = \frac{V_O}{V_{IN}} \qquad (12)$$
$$= \frac{2 + nk}{1-D} + \frac{D(1-k)(n-1)}{1-D}$$

Figure 5A:
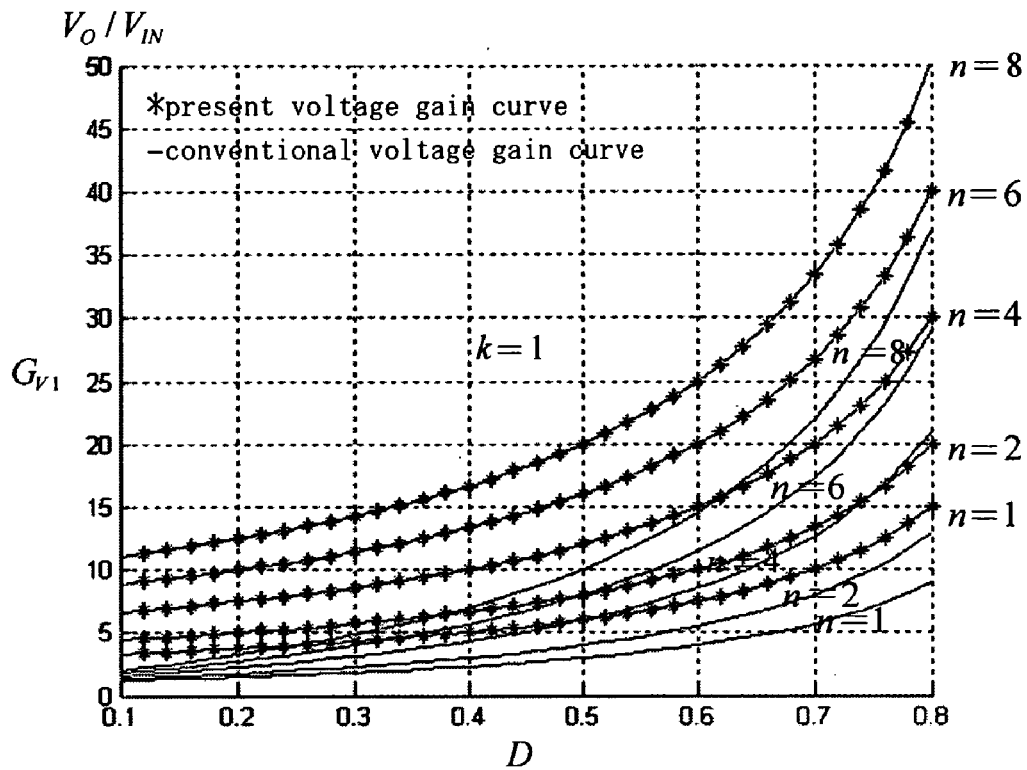
FIGS. 5(a) and (b) are the voltage gain curves of commonly used coupling inductor circuit of present invention; where 5(a) represents duty cycle D and voltage gain curves of the converter when induction coefficient k=1 and different turn ratio of winding; and 5(b) represents duty cycle D and voltage gain curves of the converter when induction coefficient changed from k=0.9 to k=1.0 and turn ratio of winding equals to 6.
Figure 5B:
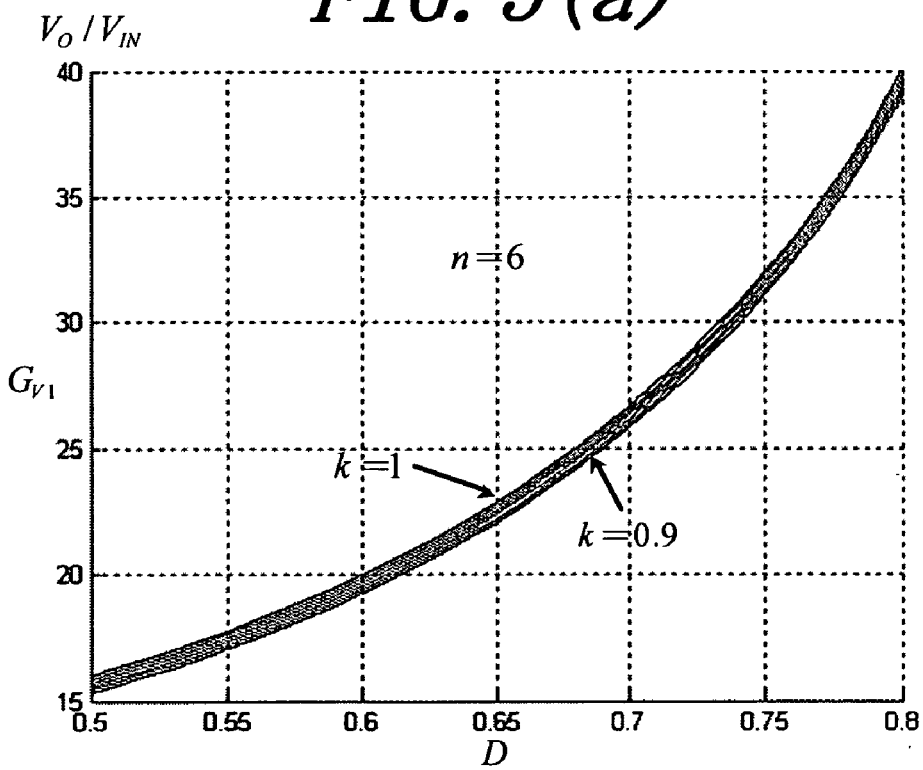

Substitute the coupling coefficient k=1 into the equation (12), when turn ratio n is 1, 2, 4, 6 and 8 respectively, duty cycle D and converter's gain curve $G_{V1}$ are as shown in FIG. (5). Then fixing turn ratio n=6 and increasing the coupling coefficient k gradually from 0.9 to 1, duty cycle D and converter gain $G_{V1}$ curves are drawn as shown in FIG. 5(b). Since analysis of the two figures reveals that the coupling coefficient k has limited impact on the voltage gain $G_{V1}$, the coupling coefficient k can be set to 1 for easier analysis of converter. When the coupling coefficient k is set to 1, the second term of equation (12) is zero, and converter's voltage gain can be simplified to:

$$G_{V1} = \frac{V_O}{V_{IN}} \qquad (13)$$
$$= \frac{2 + n}{1-D}$$

Assuming duty cycle D is at 0.5, dividing equation (13) by voltage gain equation in reference articles Zhao et al. and Tseng et al. will be 2, means that the present invention has twice of gain than theirs. In FIG. 5(a), the mark "*" is the voltage gain curves of the present invention, and solid line represents the voltage gain curves of common used coupling induction circuits (FIG. 1(b)); under the same turn ratio, the boost gain of the present invention is higher than common used/references coupling induction circuit, specially, smaller the duty cycle is, the bigger the difference will be; that is to say the present invention has wider duty cycle adjustment room. For example, put in n=6, D=0.8, 40 times output voltage gain will be obtained.

Let coupling coefficient k equals to 1 and put it in equation (8), simplified to:

$$v_{C1} = V_{IN}/(1-D) = v_{DS} \qquad (14)$$

Then put into equation (13) will lead to the voltage across the switch:

$$v_{DS} = V_O/(n+2) \qquad (15)$$

Observing equation (15), fixing output voltage $V_O$ and turn ratio n, the voltage across the switch is not related to input voltage $V_{IN}$ and duty cycle D. As long as input voltage is not higher than what the switch Q can withstand, according equation (15) designed converter, plus the character of original high voltage gain ratio, large range of high, low input voltage can be accepted, such as solar energy, wind generator and fuel cell battery etc. Also, utilizing the present invention boosting and adjusting voltage, DC storage device can provide front end power sources for anti AC device, AC/DC motor control equipments or direct application circuit equipment, or emergency power source, power source adjustment equipment for maintaining high quality power source.

The practical specifications of the present invention are shown in the following sections. Main component-semiconductor power switch Q chooses MOSFET, No. FQI90N08, conducting resistance $R_{DS(ON)}=16$ mΩ, withstand 80V and 71 A, package I²PAK. Setting output voltage to 400V, highest clamping voltage is 50V, or uses 75V low conduction loss switch; putting these data into equation (15) to calculate the turn ratio n of the coupling inductor:

$$n = \frac{V_O}{v_{DS(max)}} - 2 = 6 \qquad (16)$$

According to equation (13), setting the lowest voltage to 10V and output voltage 400V, duty cycle D will be 0.8, which is accepted for practical purpose. For the present invention, switching frequency is 100 kHz, normally used in the field, and explanation as follows:

$V_O$: 400 VDC $T_rL$: $L_1$=13 μH; $L_2$=470 μH; $N_1:N_2$=3:18; k=0.98; core: EE-55

Q: FQI90N08: 80V/71 A

Standard value $R_{DS(ON)}$=12 mΩ, Maximum value $R_{DS(ON)}$=16 mΩ, I²PAK $C_{IN}$: 3300 μF/50V*2

Figure 6A:
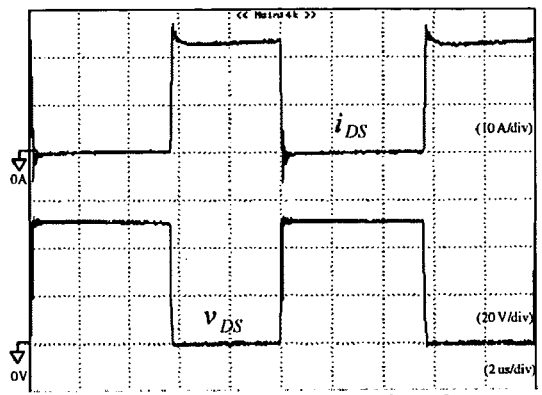
FIGS. 6(a)~6(k) is the voltage and current waveforms of each components when the present invention applied to fuel cell battery boosting voltage to 400V.
Figure 6B:
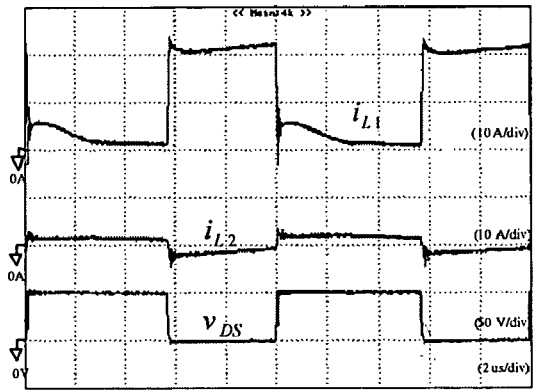
Figure 6C:
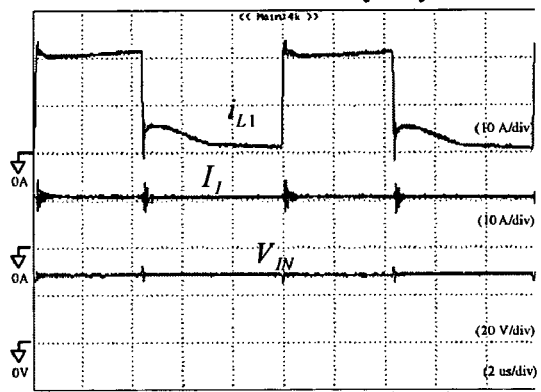
Figure 6D:
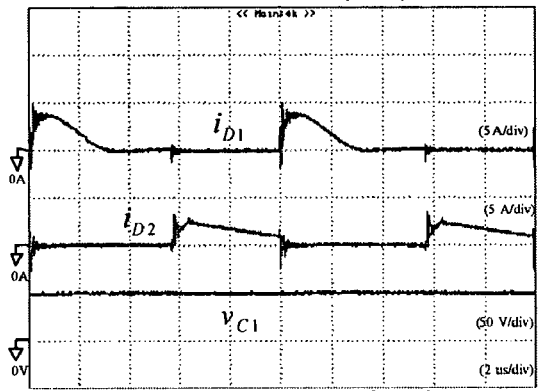
Figure 6E:
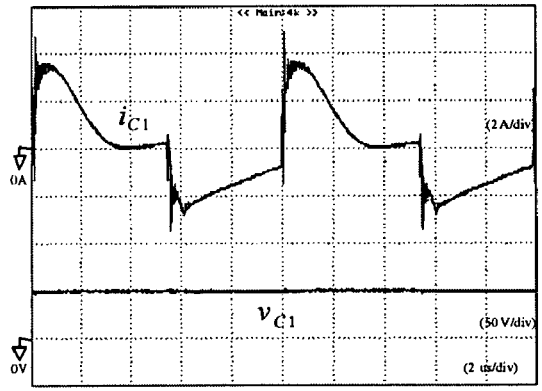
Figure 6F:
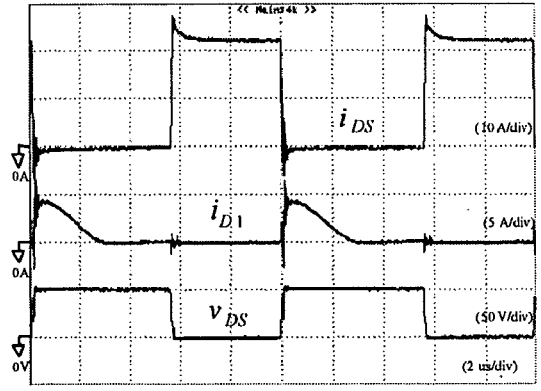

$C_1$: 5 μF/100V $C_2$: 6.8 uF/250V $C_O$: 47 uF/450V $D_1$: STPS20H100CT, 100V/2*10A (Schottky), TO-220AB $D_2$: $D_O$: SFA1606G, 400V/16A, TO-220AB To help explain the present invention, the waveforms, components specifications of following experiment are shown in FIG. 4. To prove the present invention has clamping function of voltage fluctuation and high capacity high conversion rate, FIGS. 6(a)~(k) show it is applied to fuel cell battery boosting voltage to 400V and the voltage and current waveforms of its associated components. The power source for DC input circuit 101 is fuel cell battery PowerPEMTM-PS250 made by H-Power Inc.; its output power is 250 W, output voltage from 38V (no load) to 25V (386 Maximum power output). The testing condition is 400V–300 W output, and fuel cell battery provides 28V under thus load. Referring to FIG. 6(a)–(j), the voltage $v_{DS}$ across MOSFET is clamped to 50V, and the current $i_{DS}$ is close to square waveforms showing that the switch has a fair utilization rate. In the same way, the current $i_{L1}$ of primary winding $L_1$ maintains around 20 A; for 13 μH induction value, no big iron core is required. The duty cycle is 0.44, which has ample space for adjustments, such as, input voltage variation, larger load or increasing output voltage. Since the current on high voltage side is far smaller than the current on low voltage side, it proves that the present invention have accomplished the goal for separation of the voltage and current between high and low voltage sides. Inspecting all the diodes voltage and current waveforms, reverse-regenerative current is lower than conducting current with no snubber installed, there is no spike voltage across diodes and is low than output voltage 400V; therefore, diodes achieved voltage clamping and soft switching function. FIG. 6(k) shows the present invention 400V, 20 W–300 W output voltage and current response to instant load increase and decrease; according to the waveform, voltage ripples are far lower than 1%; furthermore, since magnetic excited induction is small and energy adjustment is fast, the voltage changes little when load changes rapidly.

Another practical example of fuel cell battery system is shown in FIG. 7(a)–(f); testing condition is set to load 32 W gradually increased to 372 W, and switch voltage and current waveforms are measured. When the output power increases, the fuel cell battery voltage decreases such that duty cycle needs to be adjusted higher to increase voltage gain and maintain the output power; at the same moment, the voltage $v_{DS}$ across switch Q is still clamped to 50V. The current waveforms show that input DC voltage and current are close to low ripple square waveform.

Figure 8:
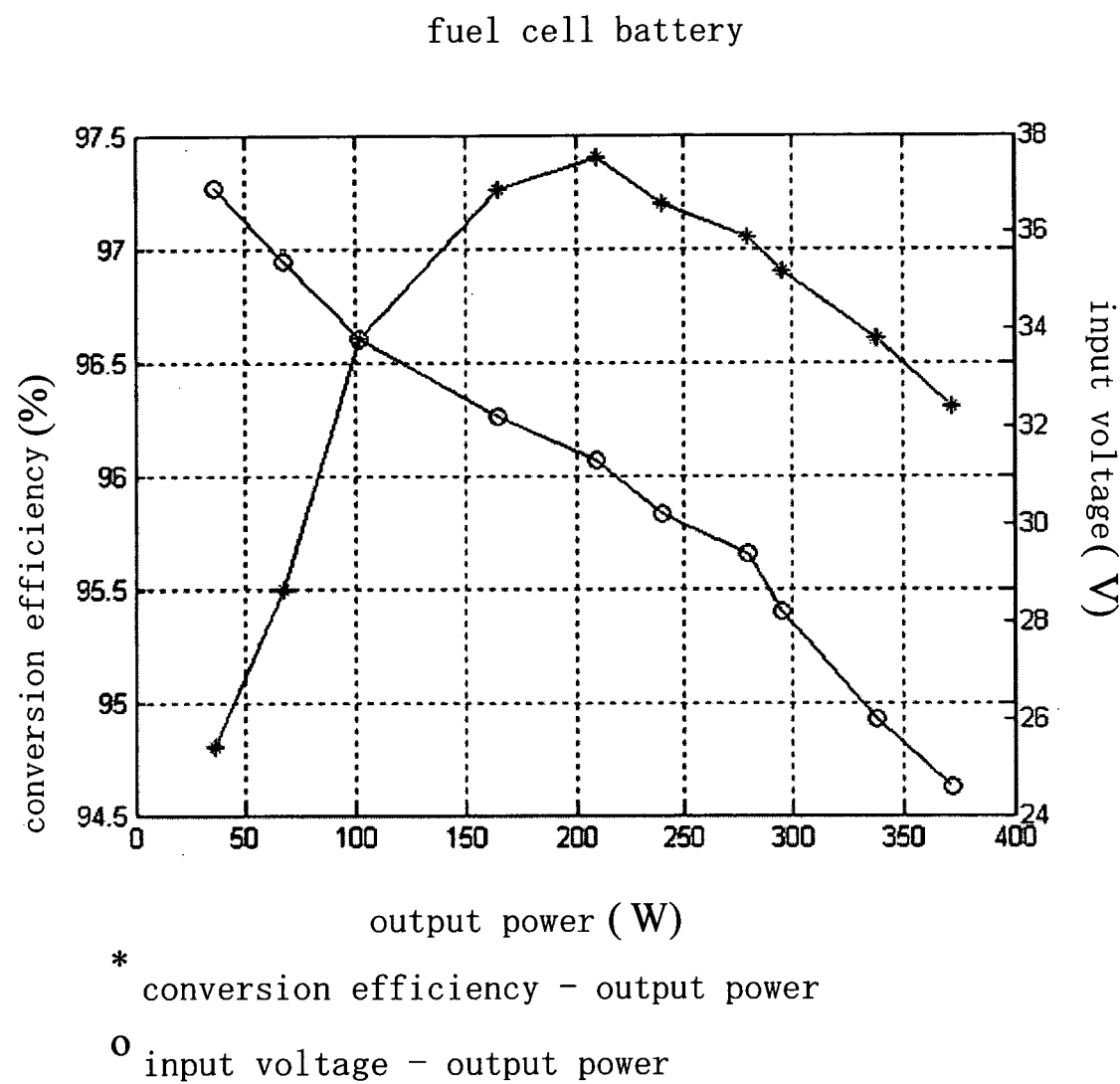
FIG. 8 is conversion efficiencies when the present invention applied to fuel cell battery boosting voltage to 400V.
Figure 9A:
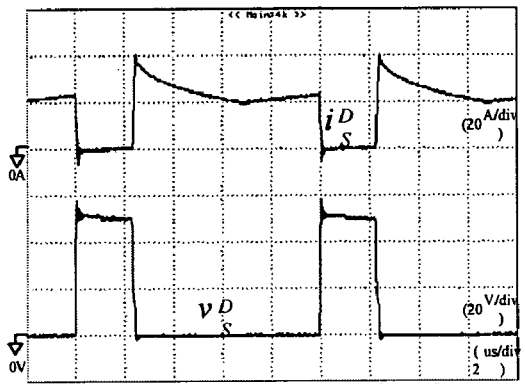
FIGS. 9(a)~(i) is the voltage and current waveforms of each components when the present invention applied to 12V rechargeable battery boosting voltage to 400V.
Figure 9B:
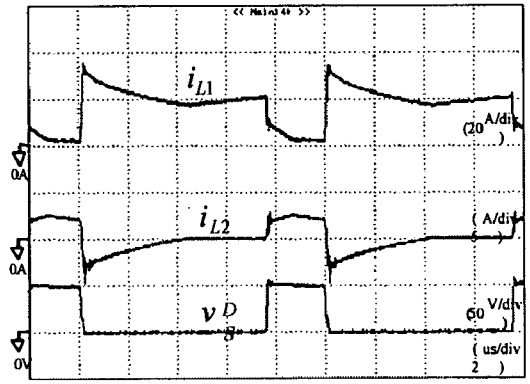
Figure 9C:
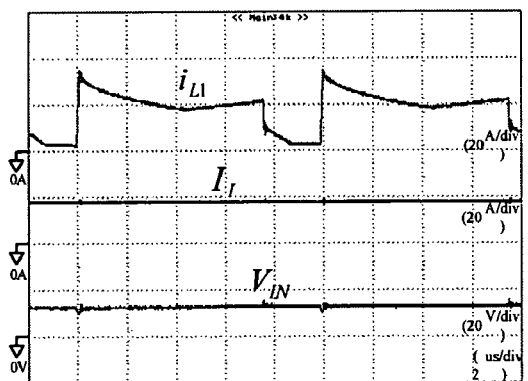
Figure 9D:
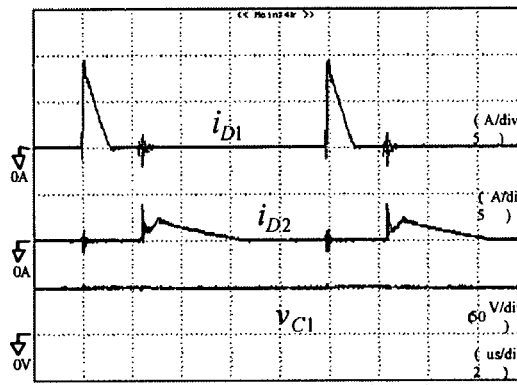
Figure 9E:
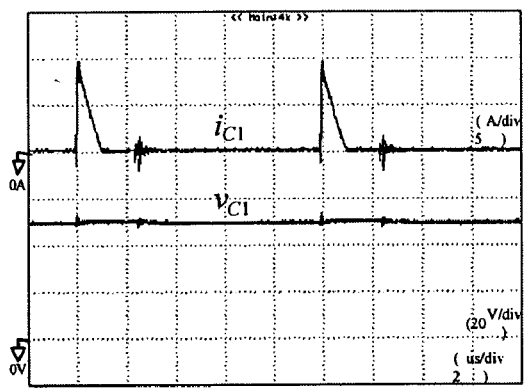
Figure 9F:
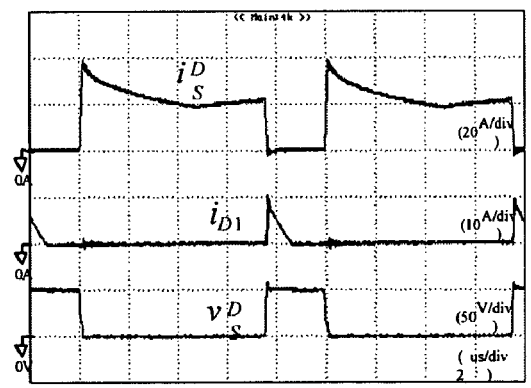
Figure 9G:
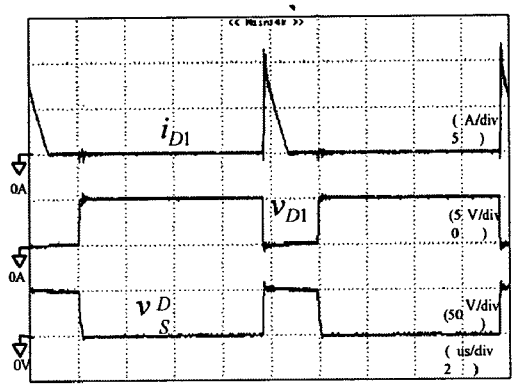
Figure 9H:
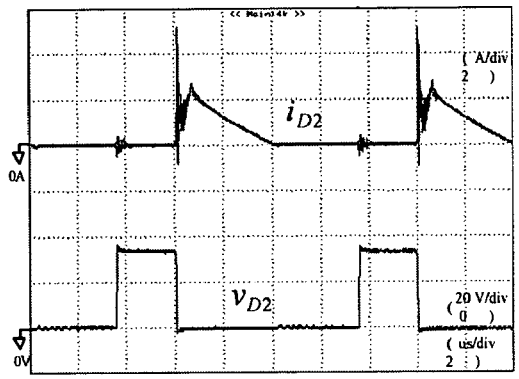
Figure 9I:
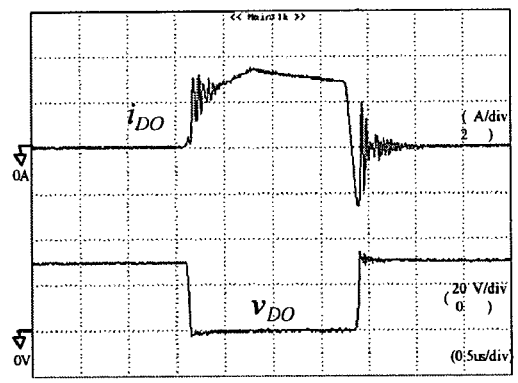
Figure 9J:
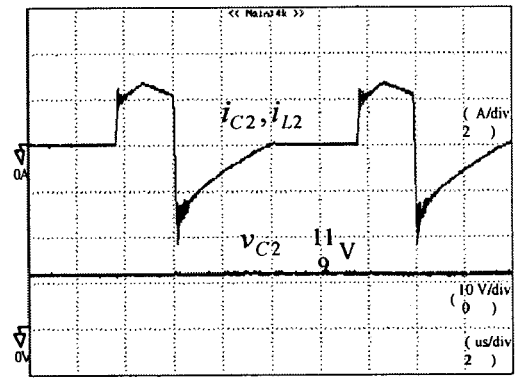

FIG. 8 is the conversion rate when the present invention applied to fuel cell battery to boost voltage to 400V. To prove theory is right, efficiency calculation does not include the power consumed by trigger signal circuit. When output power is under 200 W, resonant phenomena occurs between leakage induction of the coupling inductor and parasite capacitor of the switch, as described in reference article Lu et al., as $v_{DS}$ waveforms shown in FIG. 7(a); when the switch Q is turned on, the voltage $v_{DS}$ is lower than the clamping voltage, and switching loss is low. Because there is no circulating current problem, the switch is used in low voltage environment, switching loss and conduction loss are very low such that when the equipment outputs 40 W, the efficiency is over 94.5%, maximum efficiency is over 97%; it can be proven by commonly used circuit software. When output power is high, fuel cell voltage decrease with the power generating curve.

FIG. 9(a)–(j) is another example of the present invention with higher voltage gain, applied to 12V rechargeable battery boosting to 400V, and shows the voltage and current waveforms of each component when the output power is 210 W. From the event that switch conducting cycle increased, it proves that the voltage gain of the present invention is close to experiment result, even for low voltage power source and boosting rate over 33 times, the present invention still achieve satisfactory result. Comparing to FIG. 6(a)–(j) in sequence, even though the current of the present example has higher ripples, it still have the effect of voltage clamping.

Figure 10:
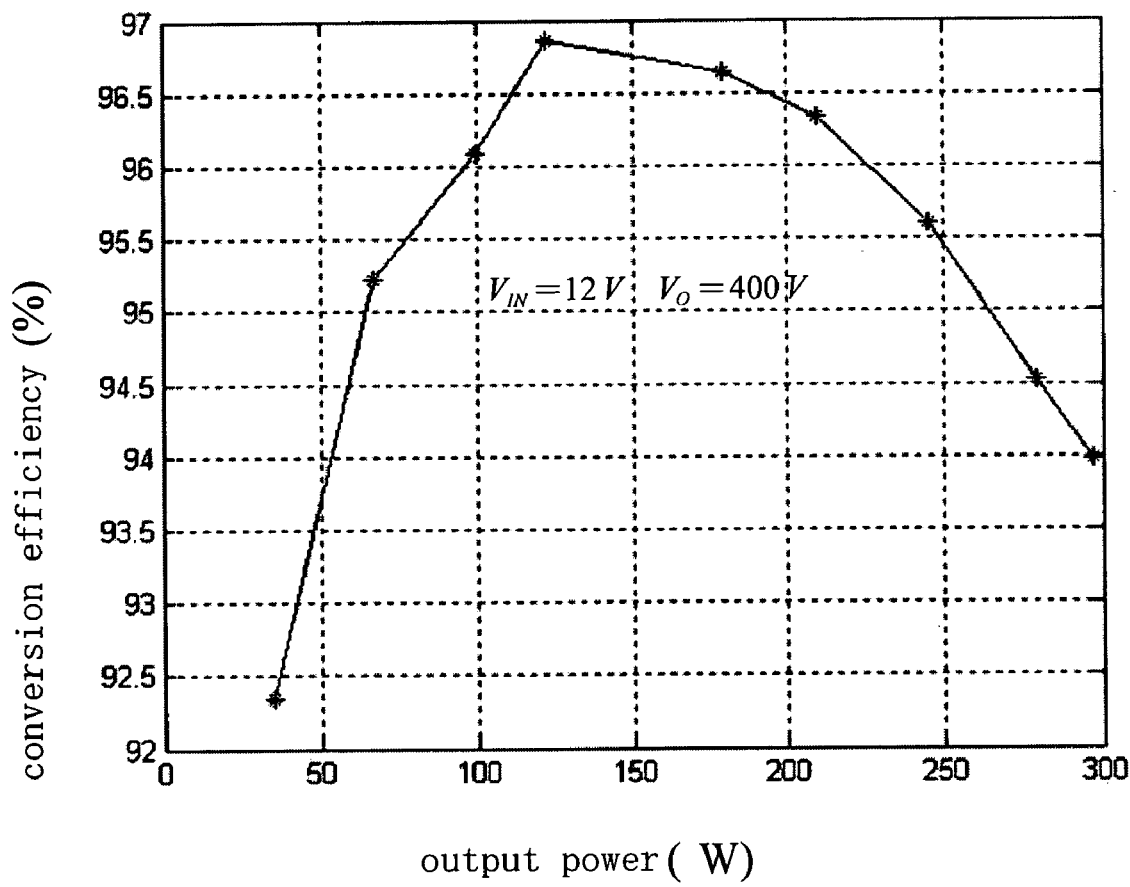
FIG. 10 is the conversion efficiencies when the present invention applied to 12V rechargeable battery boosting voltage to 400V.
Figure 11A:
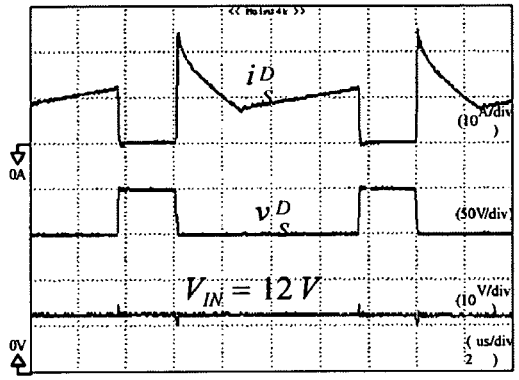
Figure 11B:
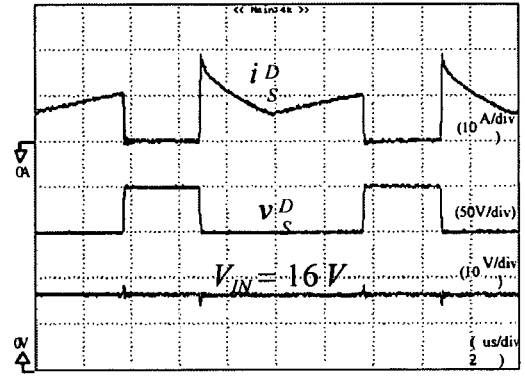
Figure 11C:
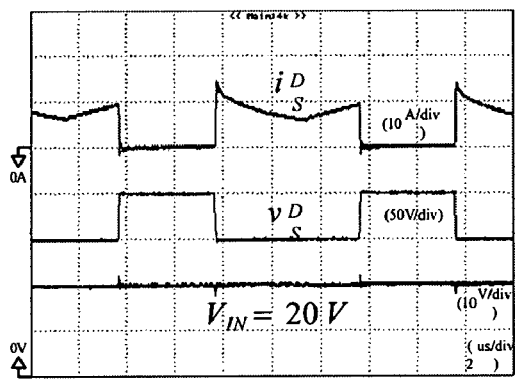
Figure 11D:
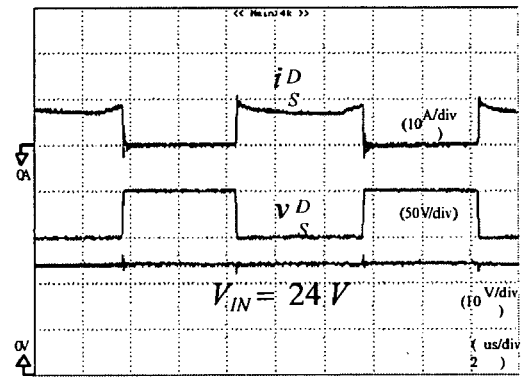
Figure 11E:
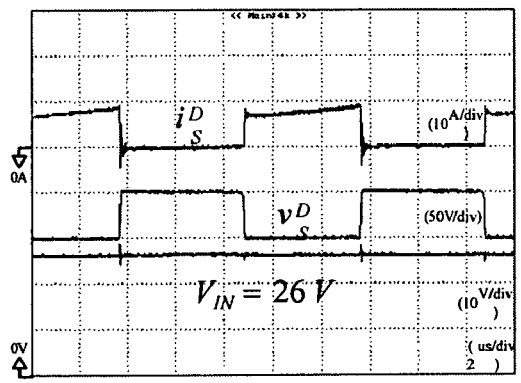
Figure 11F:
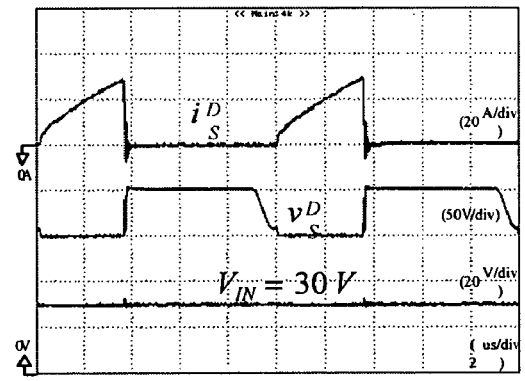

FIG. 10 is the conversion rate of the present example applied to 12V rechargeable battery boosting voltage to 400V, the maximum output power 300 W. Under the testing condition, maximum efficiency is over 96.5% and overall efficiency is lower than that in FIG. 8; but for boosting rate over 33 and the current $i_{DS}$ of the switch Q over two third specified value, it fully utilizes the capacity of the switch and its efficiency is over many listed in the references.

Figure 12:
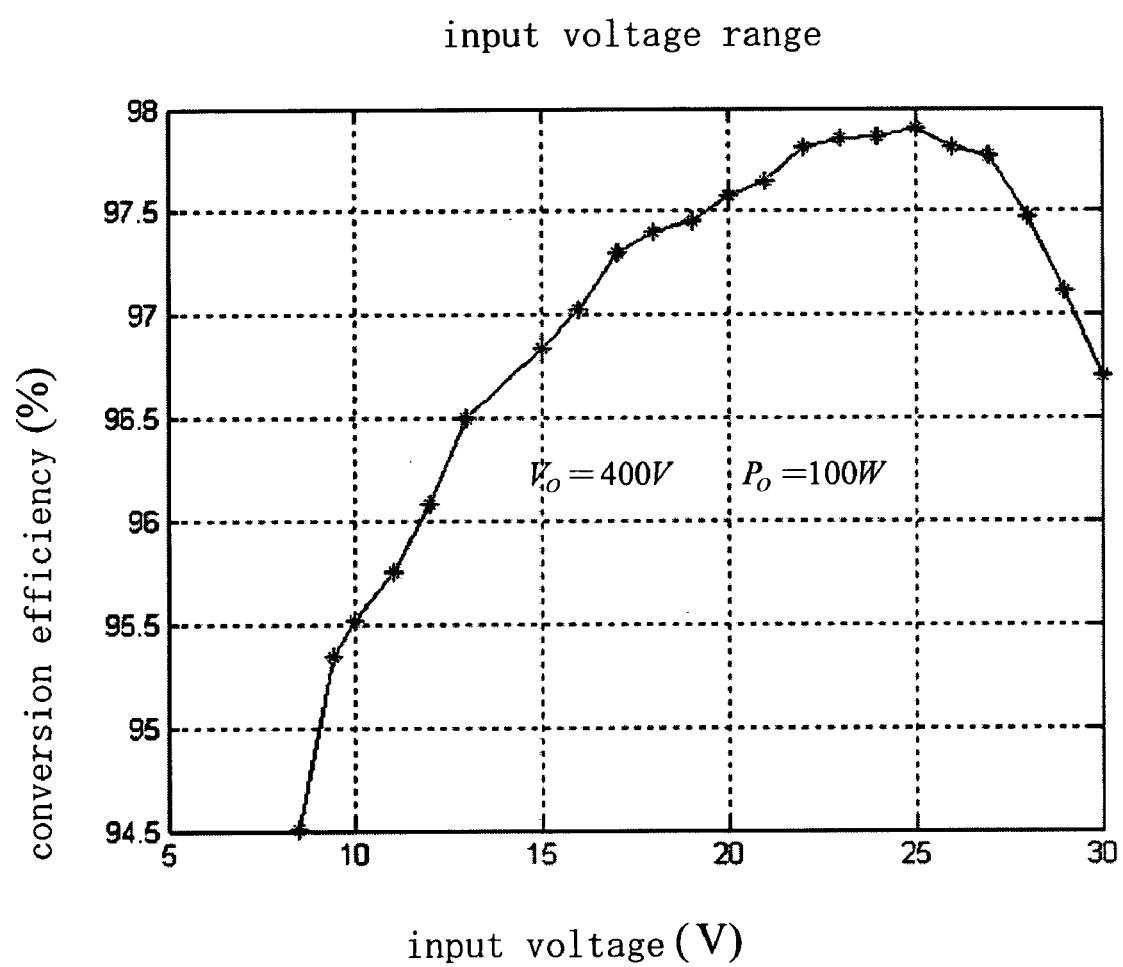
FIG. 12 is the conversion efficiencies of the present invention when DC output load is fixed at 100 W, DC input voltage boosted from 9~30V to 400V.

FIG. 11(a)–(f) shows the voltage and current measured in the present invention when DC output circuit load is fixed at 100 W, the voltage DC input circuit 101 is gradually increased from 12V to 30V, output terminal to 400V. From the experiment result, current has low ripples when duty cycle is around 0.5, which shows that at the moment, magnetic current $i_{Lm}$ is the sum of induction current $i_1$ of primary winding and the current $i_{L2}$ of secondary winding, last two main current waveforms compensated each other; during the switch is turned on, $i_{Lm}+i_1+i_{L2}$ maintains constant such that their waveforms are close to square and it effectively reduces the switch conduction loss. The conversion rate of the current example is as shown in FIG. 12, when input voltage is 25V, it's efficient is close to 98%, and voltage gain ratio is 16 times; however, for part which voltage gain is lower than 16 (input voltage higher than 25V), conversion efficiency decreases with the decrease of voltage gain. Also, the limit of the current example is that acceptable input voltage is 8V, boost rate is 50 times, efficiency 94.5%. The current example shows that because the characteristics of the present invention, even though boost rate is higher, efficiency does not necessarily decrease; in other words, the experiment result overcomes the difficulty of the previous technologies, and achieves the goal of high boost rate and high efficiency of the converter.

Summarizing above all the experimental results, the highest voltage on which the semi-conductor power switch withstands will not be over 55V, and low conducting resistance MOSFET with 75V can be chosen. In addition, the experiment shown in FIG. 10 deducts that maximum current passing through the switch is over 50 A with 12V–300 W, over two third specified current 71 A of chosen MOSFET switch FQI90N08. Therefore the switch chosen by the present invention still have extra 25V buffering zone, and the current is close to the specification, the component is easy to obtain and cheap, other components can do the same. The features and costs shown by present invention without using optimal components enhance competitiveness in factory production.

Figure 2A:
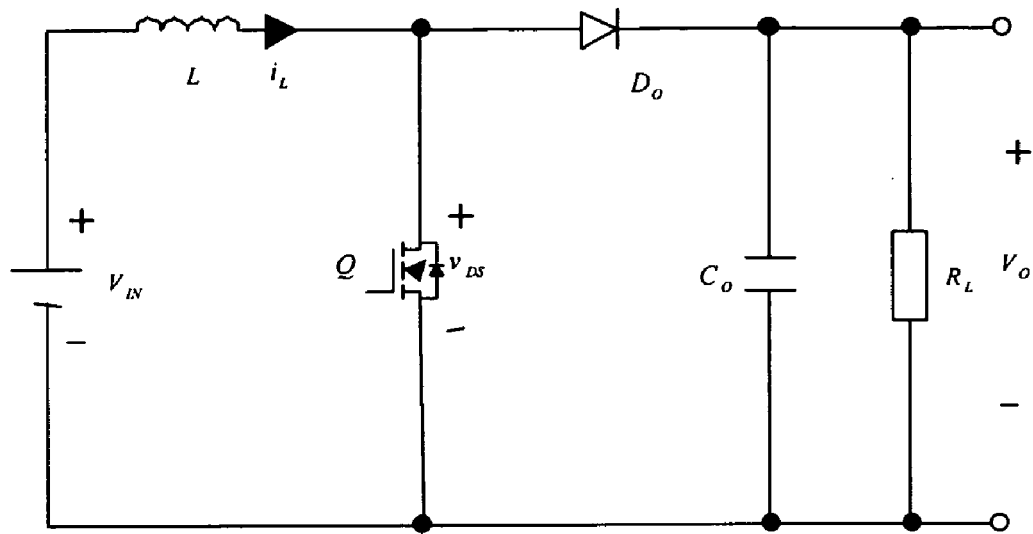
Figure 2B:
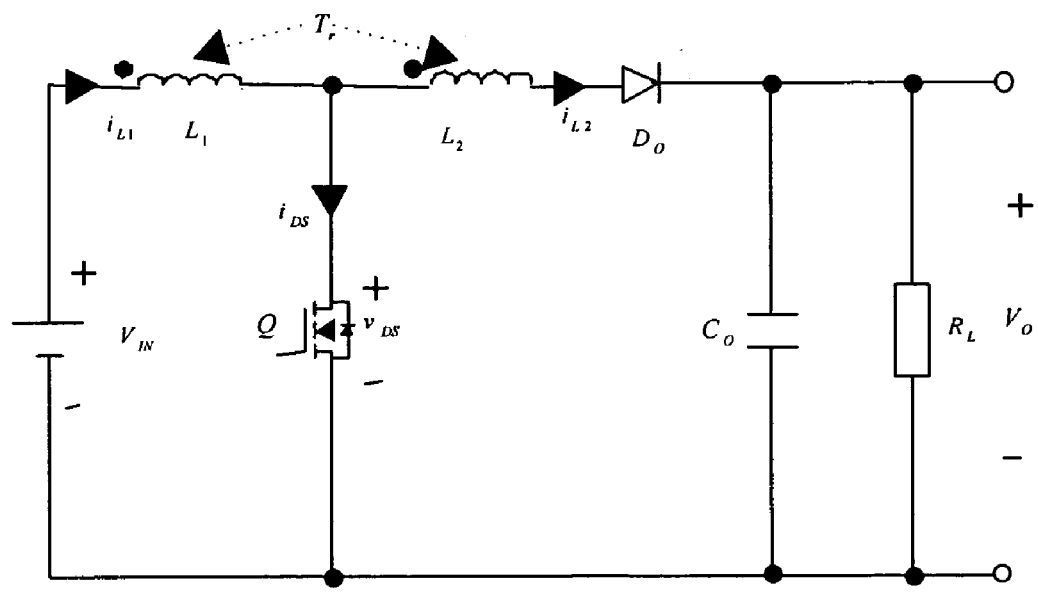
Figure 13:
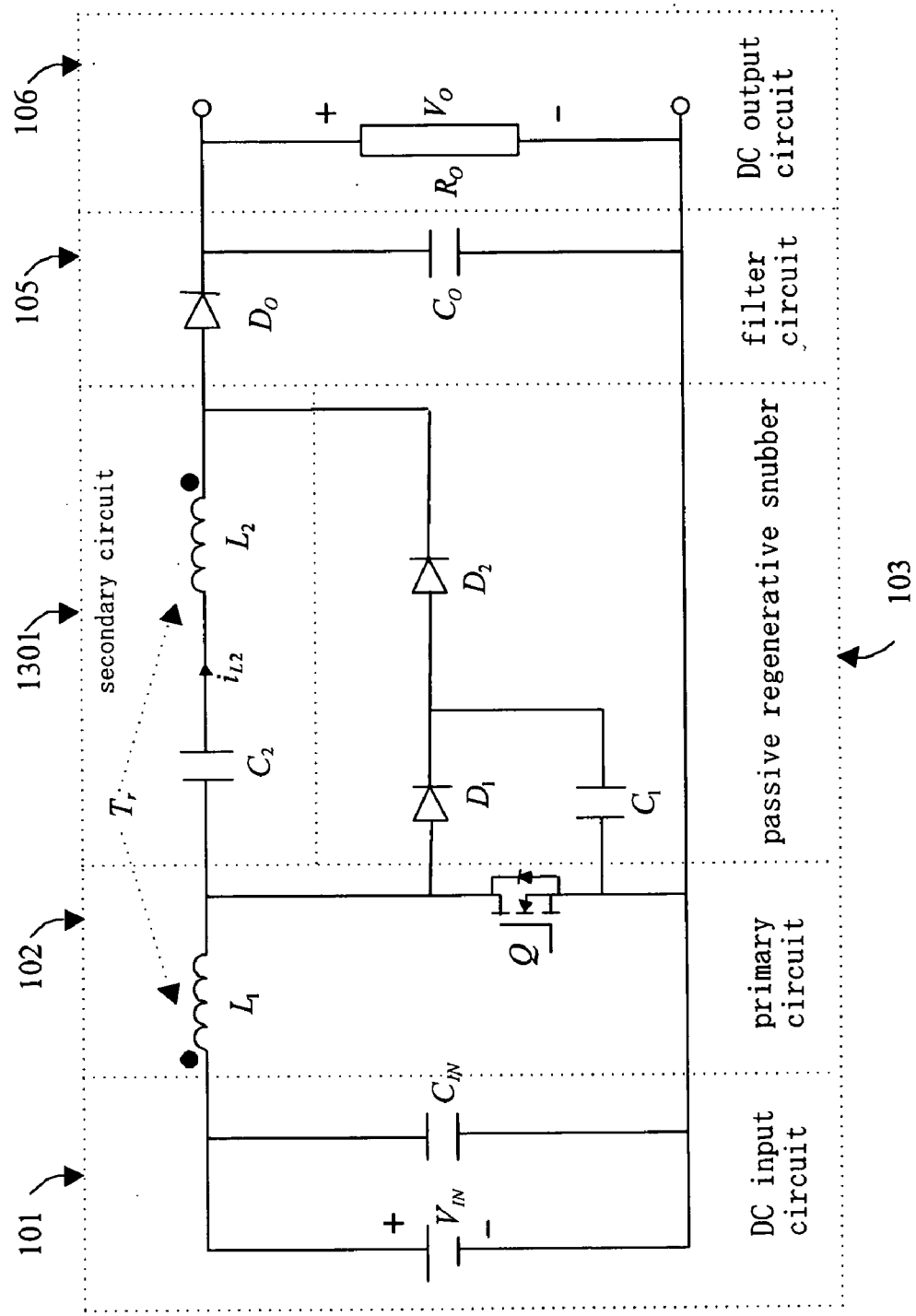
FIG. 13 is the diagram of the second preferred embodiment of the present invention.

FIG. 13 is the diagram of second preferred embodiment of the present invention. Comparing to FIG. 2, the polar wiring of secondary winding $L_2$ of coupling inductor $T_r$ of secondary circuit 1301 is reversed (polar point is defined at the place connecting to filter circuit 105). The principle of this configuration is that when the semi-conductor power switch Q of primary circuit 102 is turned on, the polar point of the secondary winding $L_2$ of coupling inductor $T_r$ of secondary circuit 1301 has a positive voltage; therefore the rectify diode $D_O$ of filter circuit 105 is turned on accordingly, output voltage $V_O$ equals to the voltage $v_{C2}$ of secondary high voltage capacitor $C_2$ plus the voltage $v_{L2}$ of the coupling inductor $T_r$. When the switch is turned off, the current $i_{L2}$ of secondary winding of coupling inductor $T_r$ is reversed, through clamping diode $D_1$ and discharge diode $D_2$, charges high voltage capacitor $C_2$. Uniqueness of this configuration is that duty cycle D is long, and passive regenerative snubber circuit 103 absorbs and releases less energy; since effective value of the current $i_{DS}$ passing the switch Q is low, the voltage $v_{DS}$ beard is relative high.

[Equation Deduction]

Referring to FIG. 13, when the switch is turned on, the polar point of secondary winding $L_2$ of coupling inductor $T_r$ has a positive voltage, adding the voltage $v_{C2}$ of the high capacitor $C_2$, charging the filter circuit 105; to simplify the process, setting coupling parameter k to 1, the output voltage $V_O$ is:

$$V_O = v_{L2} + v_{C2} \quad (17)$$

When the switch is turned off, the voltage $v_{C2}$ of high voltage capacitor $C_2$ is charged by magnetic excited current $i_{Lm}$ of primary winding of coupling inductor $T_r$ through the current $i_{L2}$ of secondary winding $L_2$; at this time, the voltage $v_{L2}$ equals to $v_{C2}$, and its value is:

$$v_{C2} = V_{IN} n D/(1-D) \quad (18)$$

When the switch is turned on, the voltage $v_{L2}$ of secondary winding $L_2$ of coupling inductor $T_r$ and the voltage $v_{C2}$ of high voltage capacitor $C_2$ together, in series, discharge to filter circuit 105; at the time, the voltage $v_{L2}$ induced by primary winding $L_1$ is:

$$v_{L2} = nV_{IN} \quad (19)$$

Substituting equation (18) and (19) into equation (17), the voltage $G_{V2}$ of second preferred embodiment is:

$$G_{V2} = \frac{V_O}{V_{IN}} = \frac{n}{1-D} \quad (20)$$

Because the voltage $v_{DS}$ across the switch Q is the same as equation (8), therefore:

$$v_{DS} = v_{C1} = V_O/n \quad (21)$$

Assuming DC input voltage is 28V, turn ratio is 6, output voltage is designed to 400V, inserting into equation (13) and (20), the duty cycle D of the first preferred embodiment is 0.44 and the duty cycle D of the second preferred embodiment is 0.58. Also, from the calculation (21), the switch Q of second preferred embodiment withstands 67V.

Figure 6:
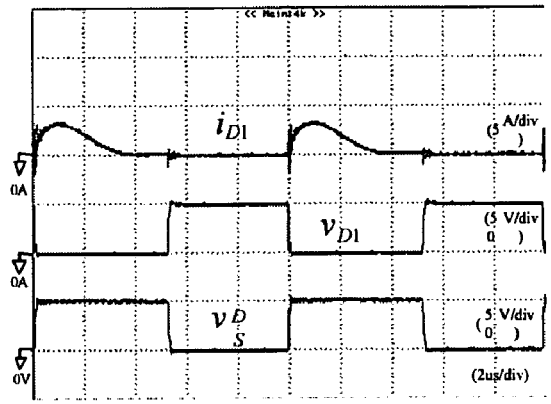
Figure 6:
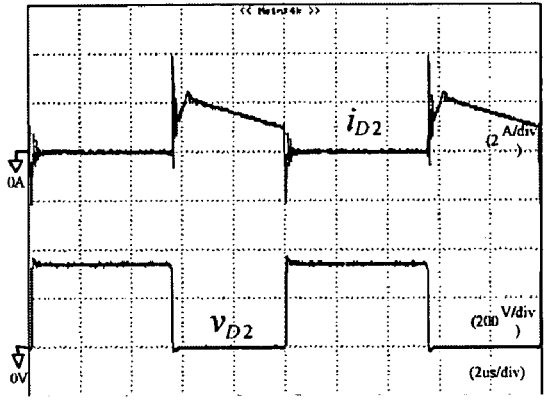
Figure 6:
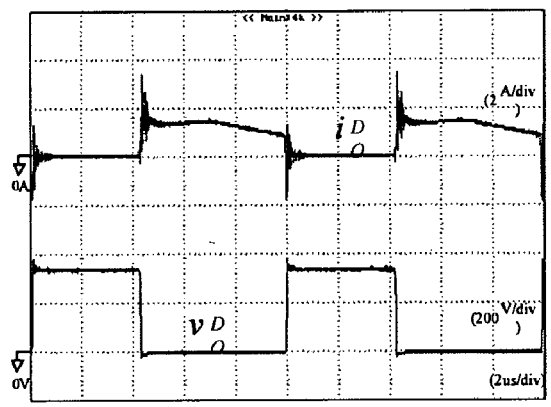
Figure 6:
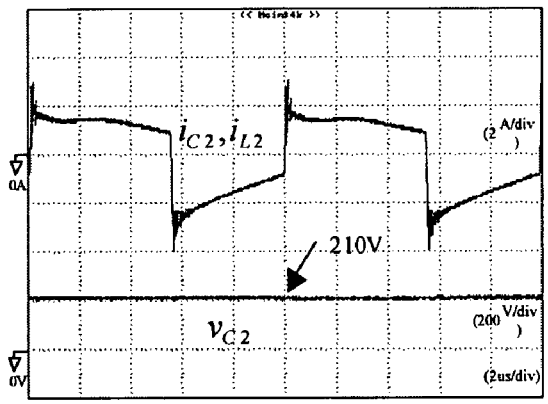
Figure 6:
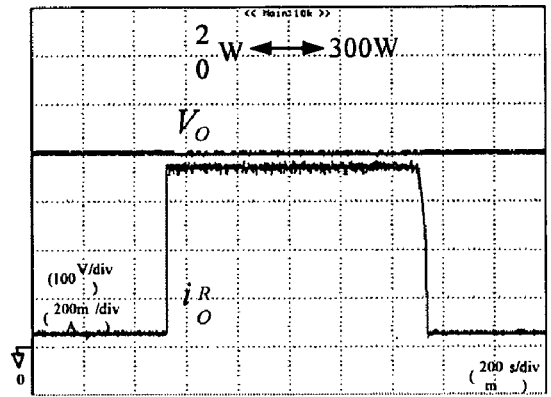
Figure 7A:
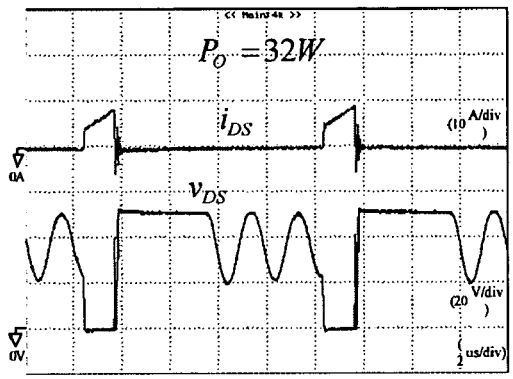
FIGS. 7(a)~7(f) the switch voltage and current waveforms when the present invention applied to fuel cell battery boosting voltage to 400V, load range 32 W to 372 W.
Figure 7B:
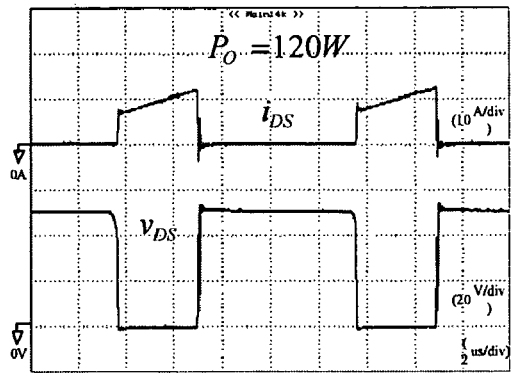
Figure 7C:
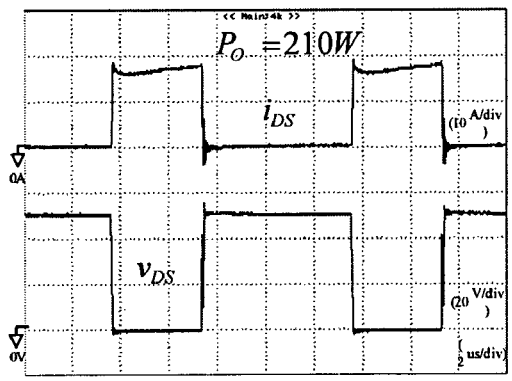
Figure 7D:
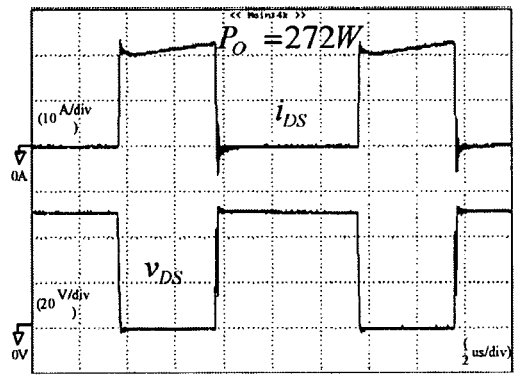
Figure 7E:
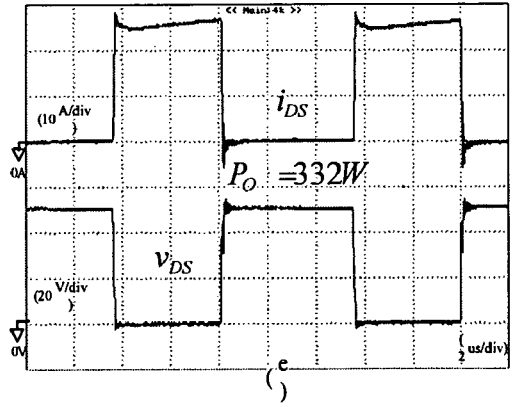
Figure 7F:
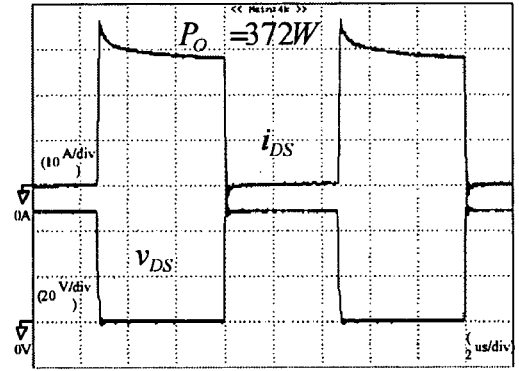
Figure 14A:
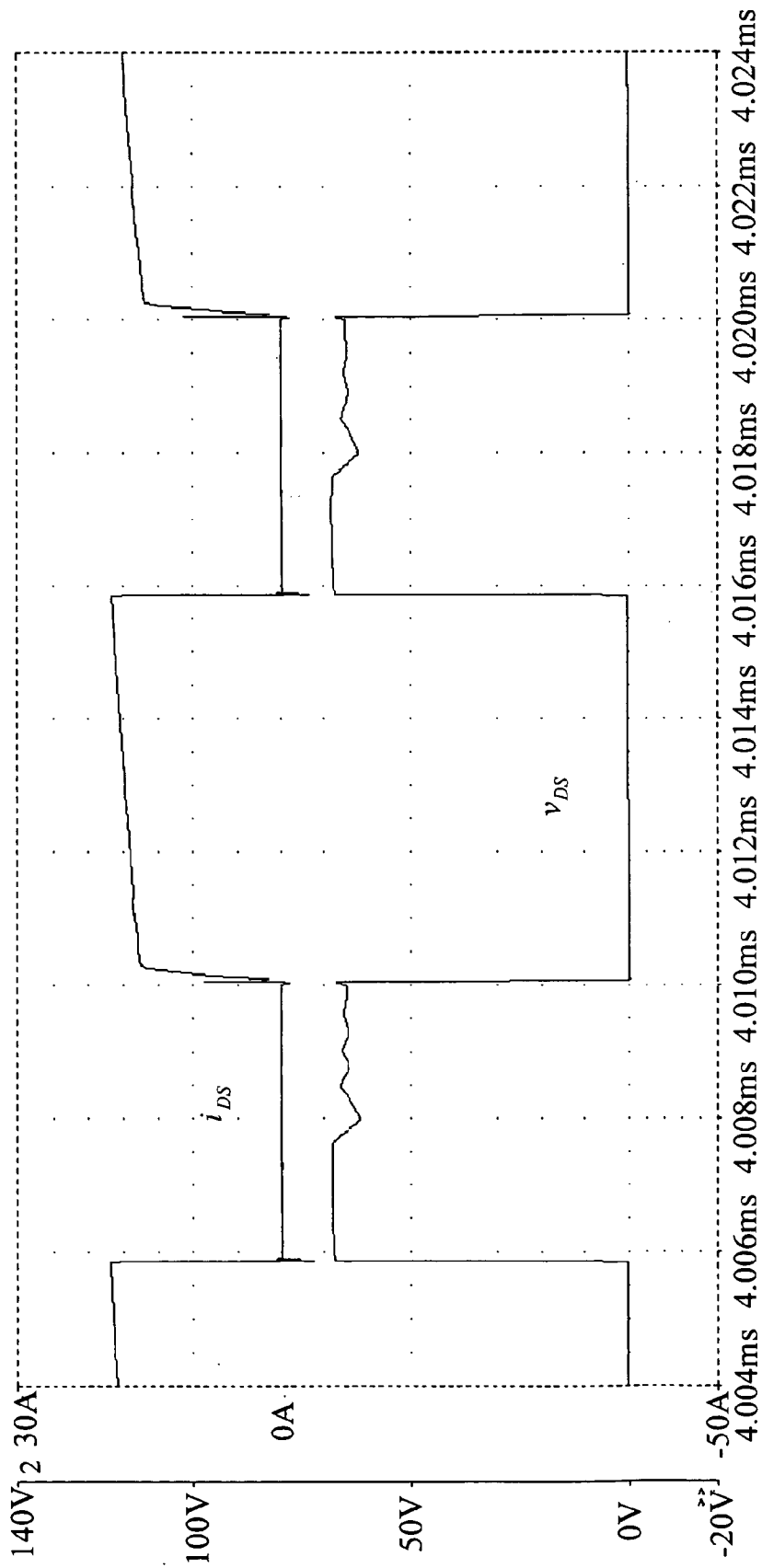
FIGS. 14(a)~(b) is the simulated wave responses of the second preferred embodiment of the present invention.
Figure 14B:
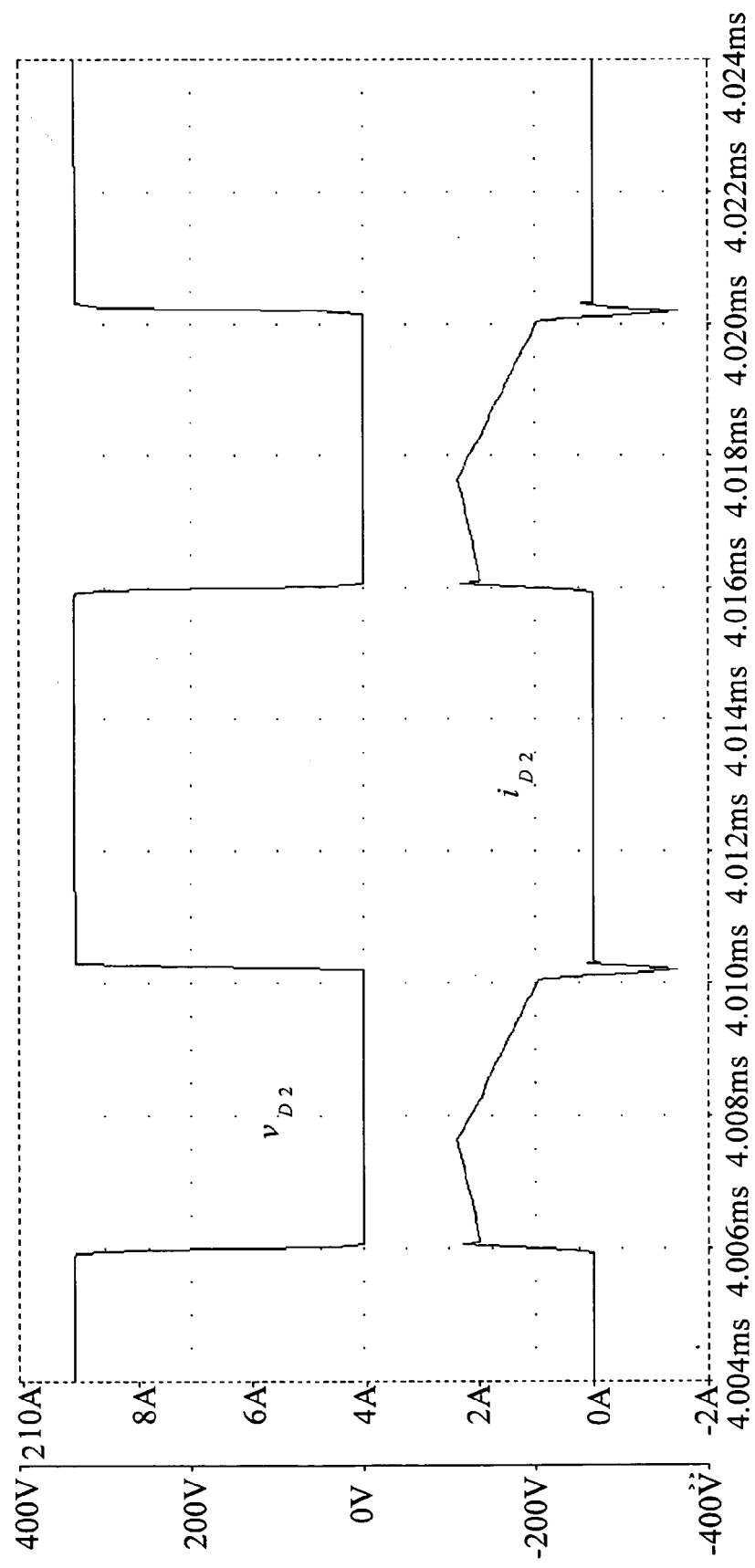
Figure 14C:
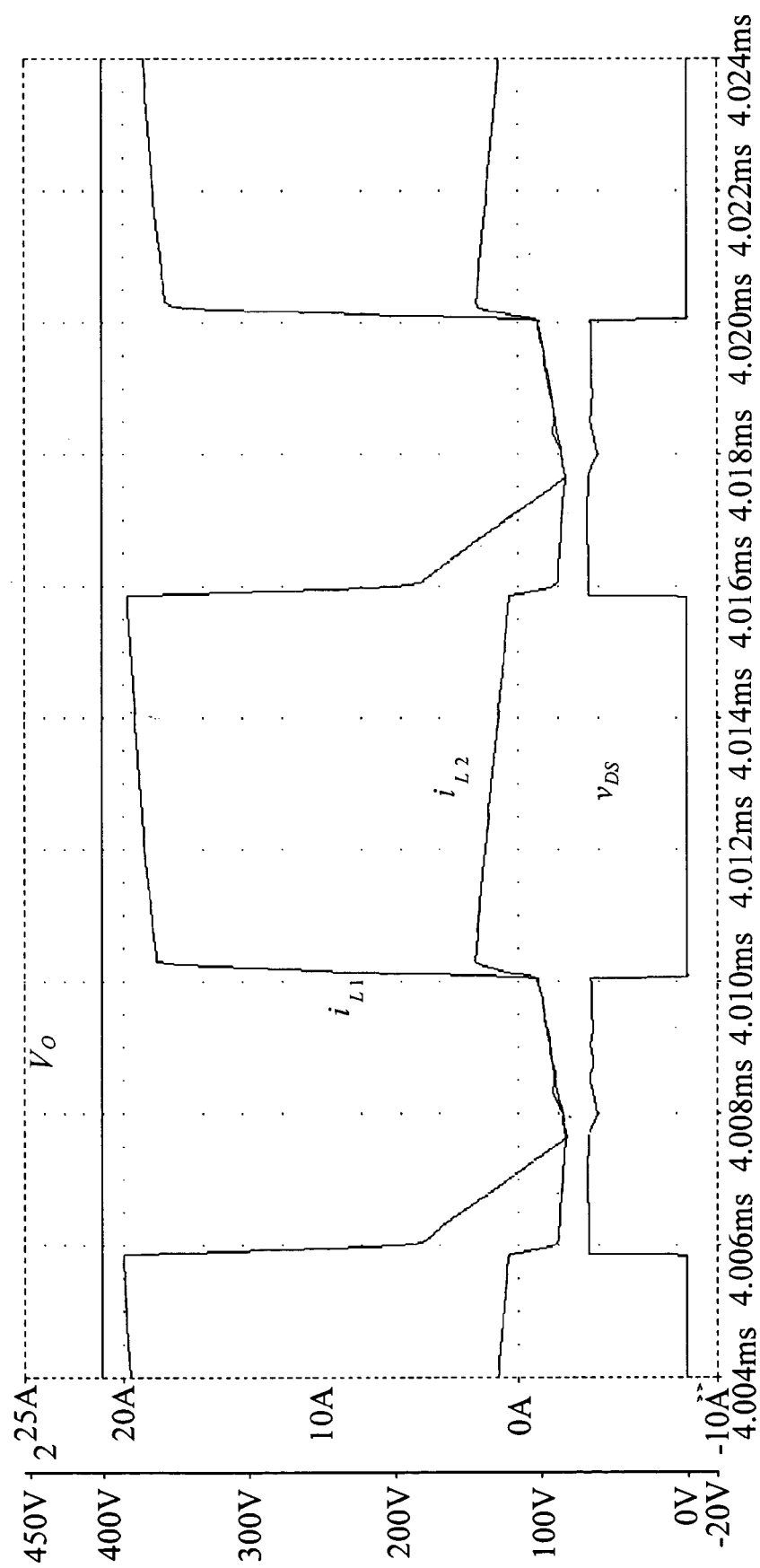

FIG. 14(a)–(c) are waveforms of simulated response of second preferred embodiment. These waveforms are simulated by PSPIC circuit software; to simplify the comparison between the simulation results, circuit components are the same as the first preferred embodiment, simulation condition compared to FIG. 6, input voltage is 28V, and output is 400V–300 W. From the waveforms showed, the voltage across the switch Q is raised to 67V, but its current $i_{DS}$ peak is apparently reduced. The reverse-recovery current problem is effectively dealt by the voltage $v_{D2}$ and current $i_{D2}$ waveforms of discharge diode $D_2$ of passive regenerative snubber 103. After the switch Q is tuned off for a period of time, the current in of primary winding $L_1$ of coupling inductor $T_r$ gradually closes to the current $i_{L2}$ of secondary winding $L_2$, and eventually equals after passing through the same route; this phenomena helps, when the switch Q is turned on, the current $i_{DS}$ can't immediately draw current from primary winding $L_1$ to form zero current switching; there are a little current when the switch Q is turned on in the simulation, which is caused by chosen regular diode for clamping diode Q (the simulation software did not provide Schottky diode option); it is reverse-recovery current of clamping diode, and if Schottky diode used in real testing there should be no thus current. This simulation has proven that the circuit in FIG. 13 can strictly separate the high voltage side current from the low voltage side current.

Figure 15:
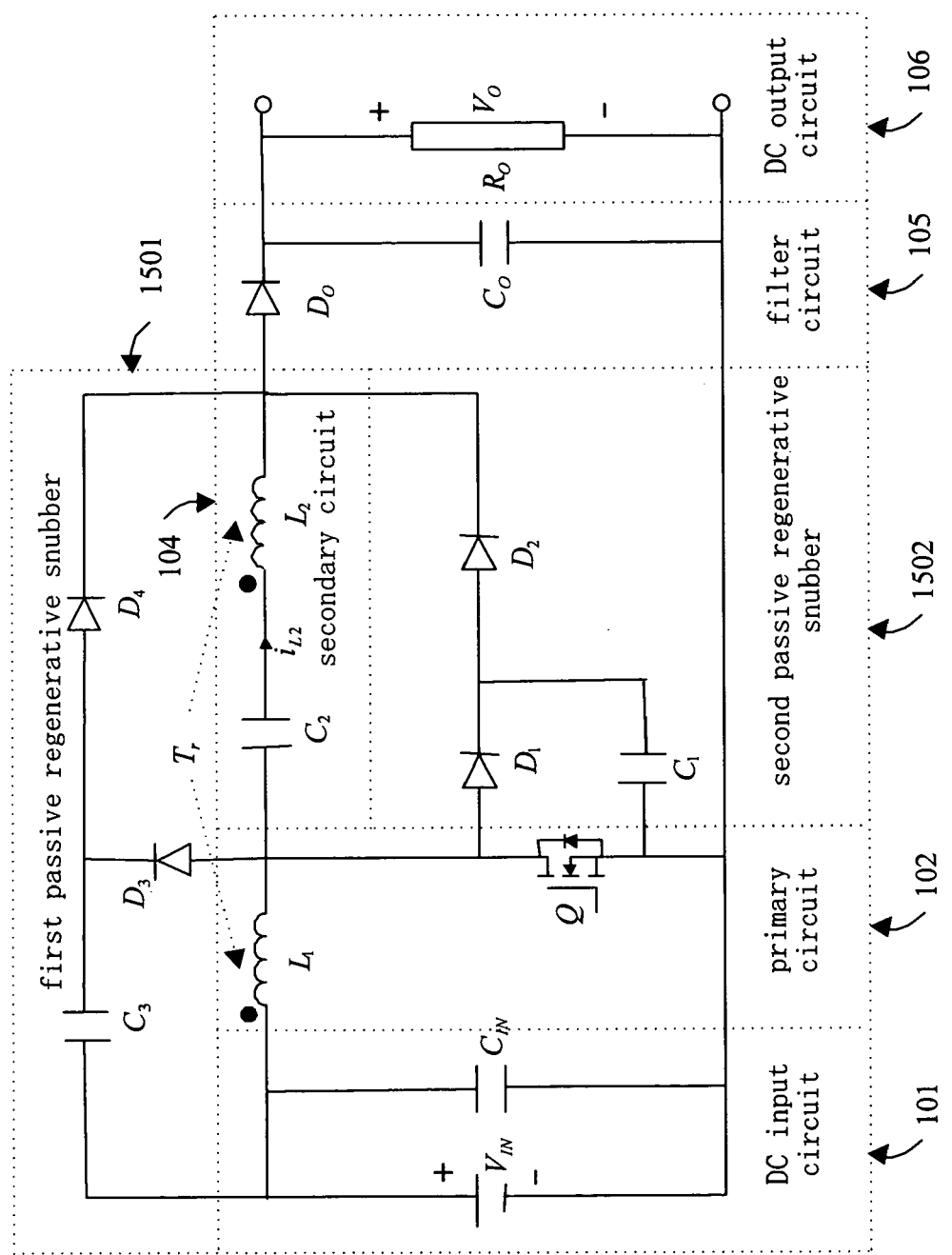
FIG. 15 is the diagram of the third preferred embodiment of the present invention.

FIG. 15 is the diagram of third preferred embodiment of the present invention. This real example has the same features as that in FIG. 2 and FIG. 13, that is, first passive regenerative snubber 1501 replaces passive regenerative snubber 103 in FIGS. 2 and 13 (second passive regenerative snubber 1502 can be added or omitted). The wiring of secondary winding $L_2$ of coupling inductor $T_r$ in secondary circuit 104 is that polar point is on the left, the time when the voltage $v_{C2}$ of high voltage capacitor $C_2$ is charged is the time when the switch Q is turned on and the circuit functions in similar fashion as FIG. 2. When the semi-conductor power switch Q of primary circuit 102 is turned on, the polar point of second winding $L_2$ of coupling inductor $T_r$ is positive, its voltage $v_{L2}$ connecting to clamping diode $C_3$ and DC power source $V_{IN}$ in series, charges the high voltage capacitor $C_2$ through the switch Q and discharge diode $D_4$. When semi-conductor power switch Q is turned off, the clamping diode $D_3$ guides the spike current $i_{L1}$ of primary winding $L_1$ to charge the clamping capacitor $C_3$. After the current $i_{L2}$ of secondary winding $L_2$ is reversed, four voltages connected in series charge filter circuit 105 through rectifying diode $D_O$; the four voltages are voltage $v_{C2}$ of high voltage capacitor $C_2$, voltage $v_{L2}$ of secondary winding $L_2$ (non polar point is positive), voltage $v_{L1}$ established by magnetic excited current $i_{Lm}$ of primary winding $L_1$ and DC power source $V_{IN}$. For the third preferred embodiment, second passive regenerative snubber can be added in optionally and connect to the first snubber in parallel, which can evenly absorb spike current.

The equation for voltage gain of the current embodiment is the same as first preferred embodiment, and its deduction is the same and thus is omitted; its function can be proven by following simulation experiment.

Figure 16A:
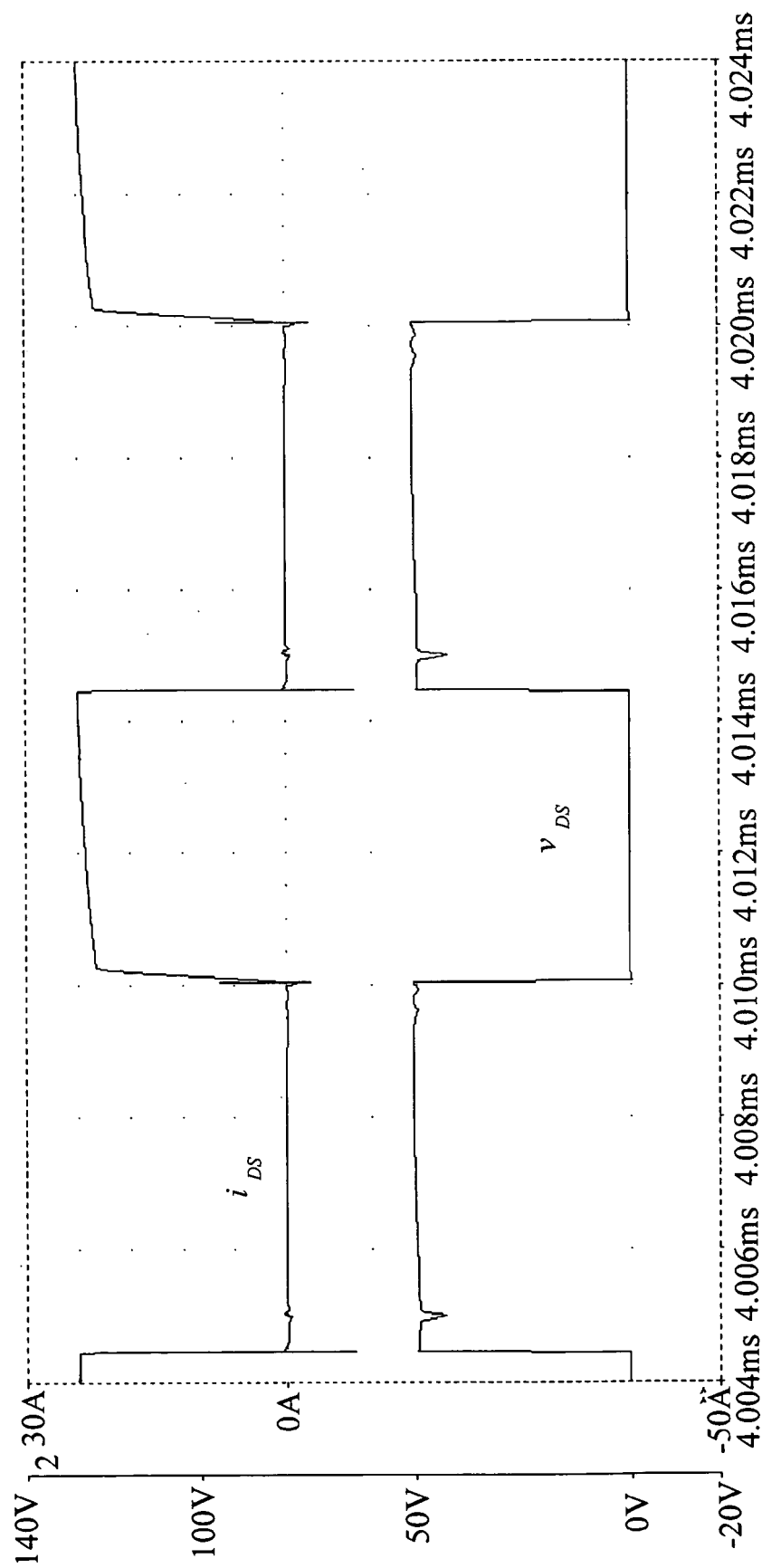
FIGS. 16(a)~(c) is the simulated wave responses of the third preferred embodiment of the present invention.
Figure 16B:
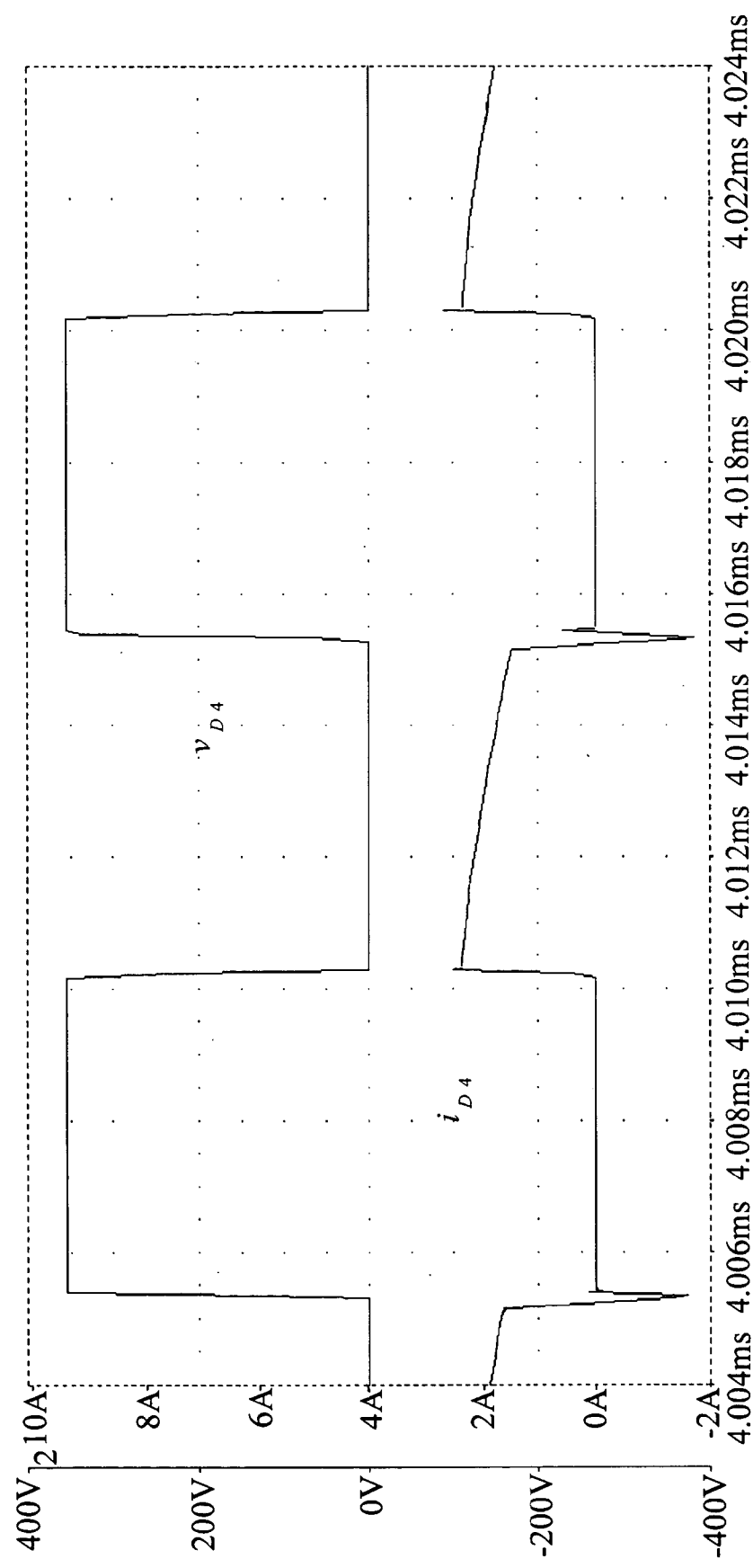
Figure 16C:
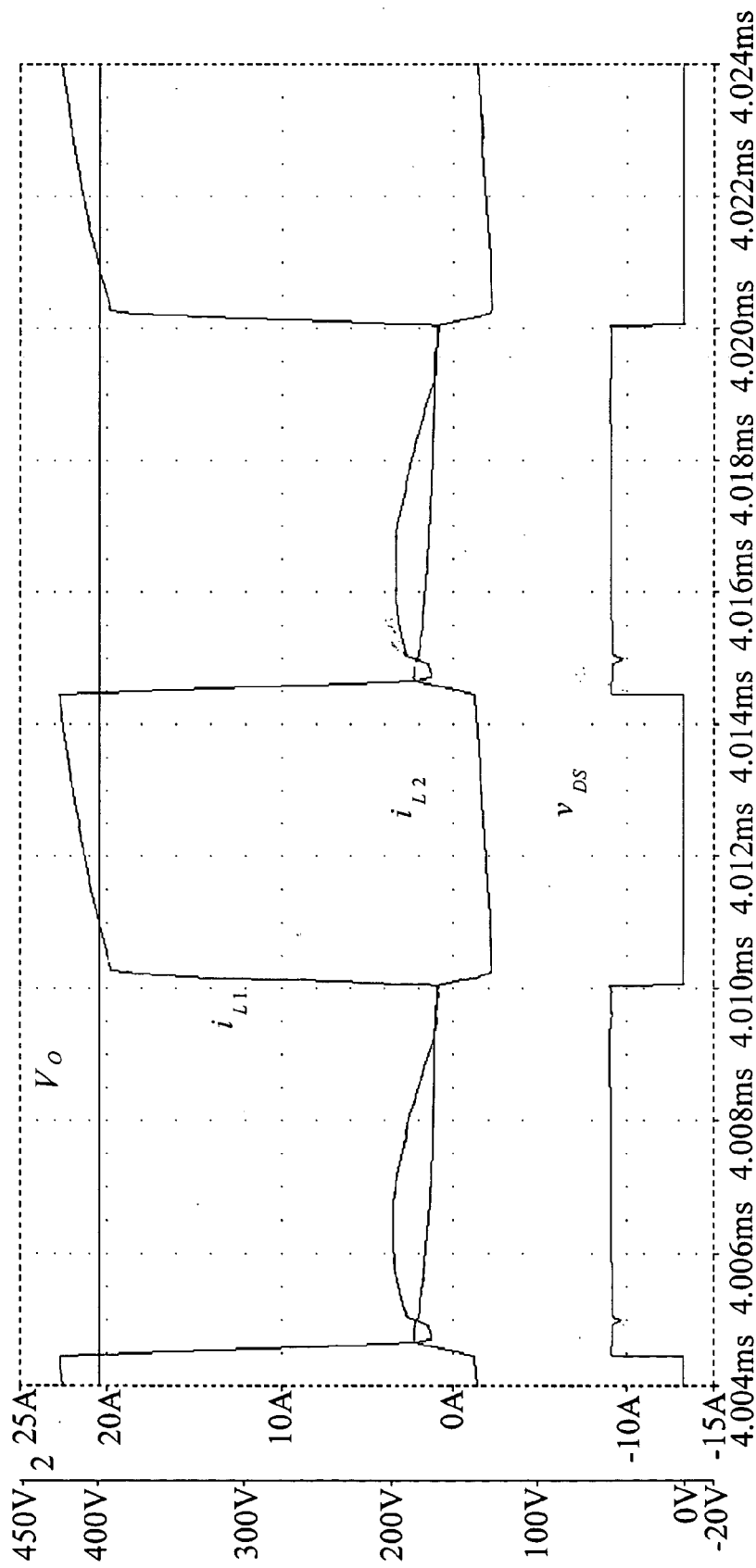

FIG. 16(a)–(c) are simulated waveform responses of third preferred embodiment. The simulation condition is the same as in FIG. 6, input voltage 28V, output specification is 400V–300 W, but do not include second passive regenerative snubber 1502. According to the waveforms showed, the voltage across semi-conductor power switch Q is 50V, same as in first preferred embodiment, and the current $i_{DS}$ has no apparent difference. The reverse-recovery current problem is effectively dealt by the voltage $v_{D4}$ and current $i_{D4}$ waveforms of discharge diode $D_4$ of passive regenerative snubber 1501. This simulation has proven that the circuit in FIG. 15 can strictly separate high voltage side current from low voltage side current.

Figure 17:
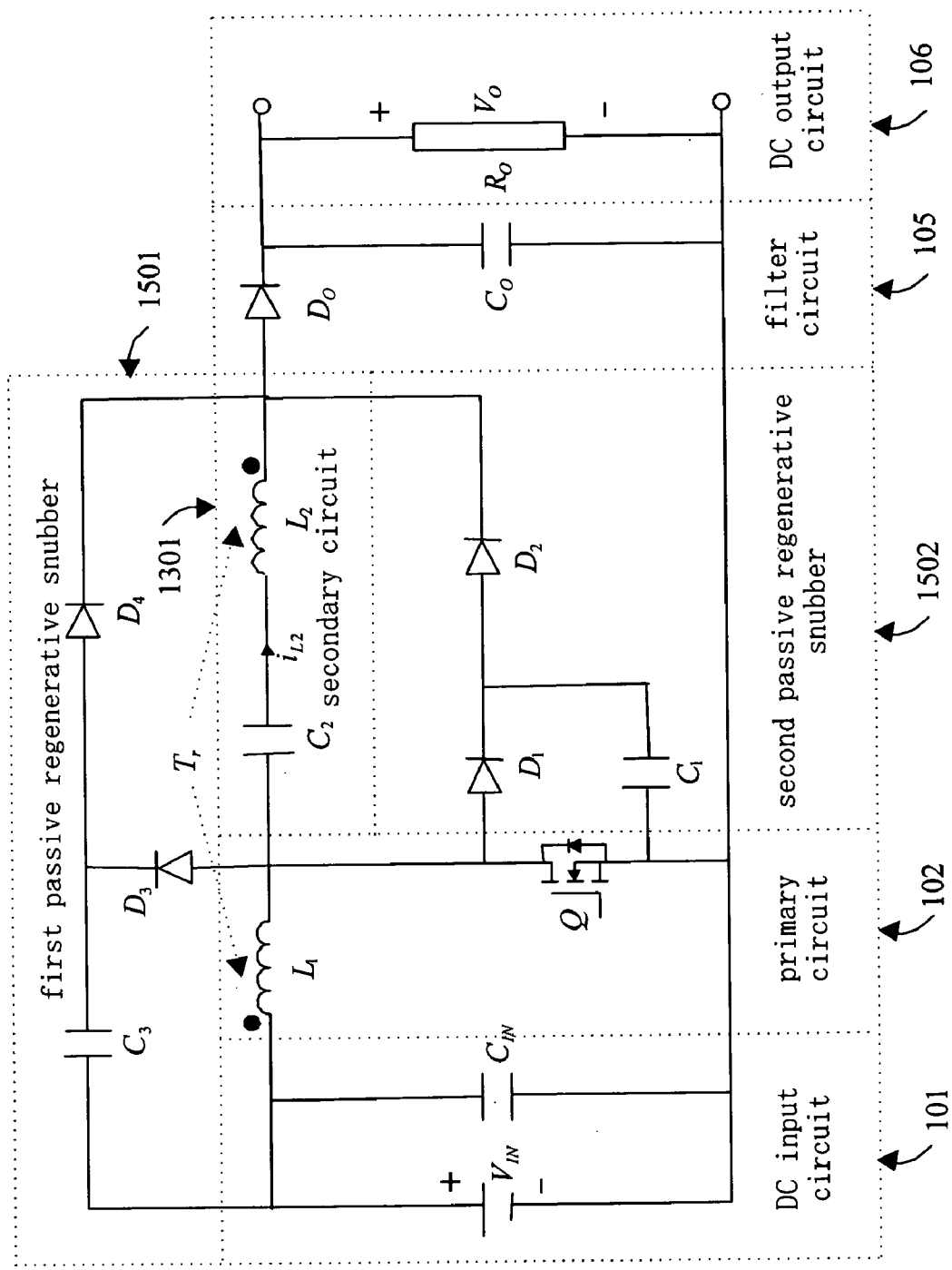
FIG. 17 is the diagram of the forth preferred embodiment of the present invention.

FIG. 17 is the diagram of forth preferred embodiment of the present invention. Comparing to the configuration in FIG. 15, the polar wiring of secondary winding $L_2$ of coupling inductor $T_r$ in secondary circuit 1301 is reversed, and its polar point is defined as the place connecting to filter circuit 105. Same features as in FIG. 13, first passive regenerative snubber 1501 replaces passive regenerative snubber 103 in FIG. 13. When the semi-conductor power switch Q of primary circuit 102 is turned on, polar point of the secondary winding $L_2$ of coupling inductor $T_r$ is positive, its voltage $v_{L2}$ connecting the high voltage capacitor $C_2$ in series, charges the filter capacitor $C_O$ through the rectify diode $D_O$ of filter circuit 105. When the semi-conductor power switch Q is turned off, the spike current of primary winding $L_1$ of the clamping diode $D_3$ charges the clamping filter $C_3$. After the current $i_{L2}$ of secondary winding $L_2$ is reversed, three voltages in series minus the voltage $v_{L1}$ established by magnetic excited current $i_{Lm}$ of primary winding $L_1$, charge the high voltage capacitor $C_2$ of secondary circuit 1301 through the discharge diode $D_4$; the three voltages are voltage $v_{C3}$ of high voltage capacitor $C_3$, voltage $v_{L2}$ of secondary winding $L_2$ (non polar point is positive) and DC power source $V_{IN}$. For forth preferred embodiment, second passive regenerative snubber can be added in parallel with the first snubber, which can evenly absorb spike current.

The voltage $v_{C2}$ of high voltage capacitor $C_2$ of secondary circuit 1301 almost completely comes from secondary winding $L_2$, and since DC input circuit 101 and primary circuit 102 cancels out each other, it directly discharges to filter capacitor $C_O$ of direct discharging filter without passing through anything; thus the gain of this configuration is relative low, and clamping voltage is relative high; after raising duty cycle maintaining fixed output voltage, the effective current of semi-conductor power switch Q can be reduced, in other words, switch loss and the current beard can be reduced.

The voltage gain equation is the same as the one of second preferred embodiment; its deduction is the same and is omitted here. Its function can be proven by following simulation.

Figure 18A:
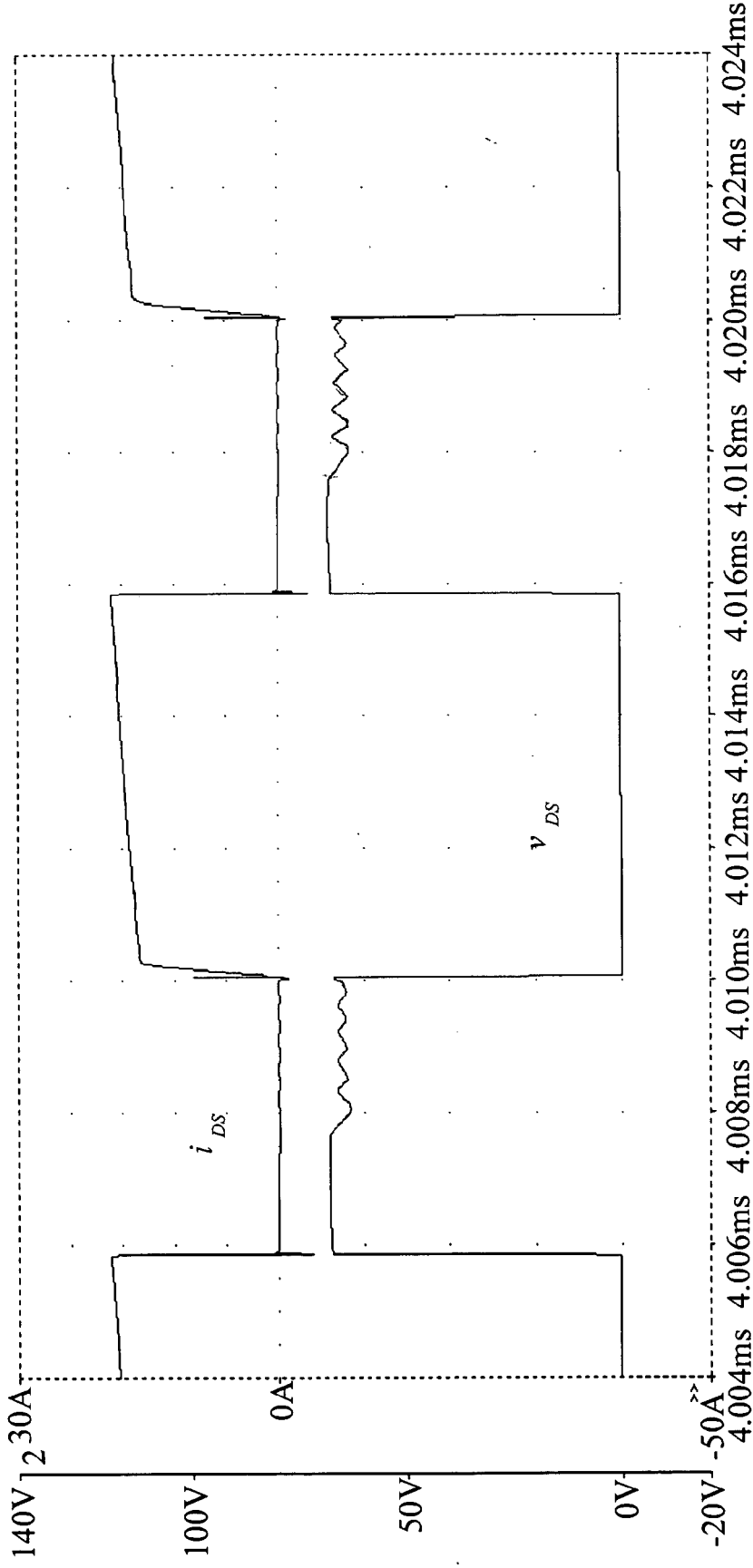
FIGS. 18 (a)~(c) is the simulated wave responses of the forth preferred embodiment of the present invention.
Figure 18B:
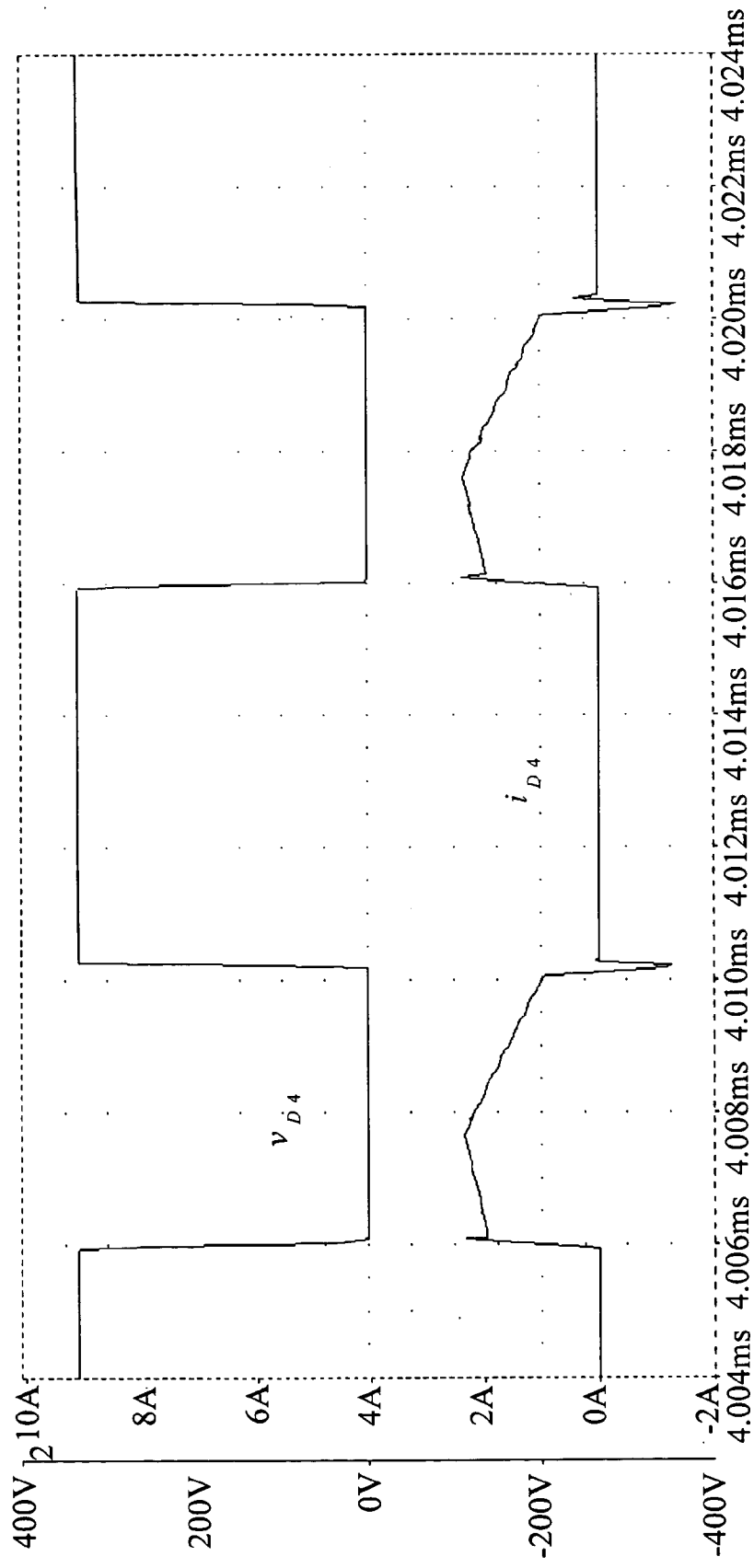
Figure 18C:
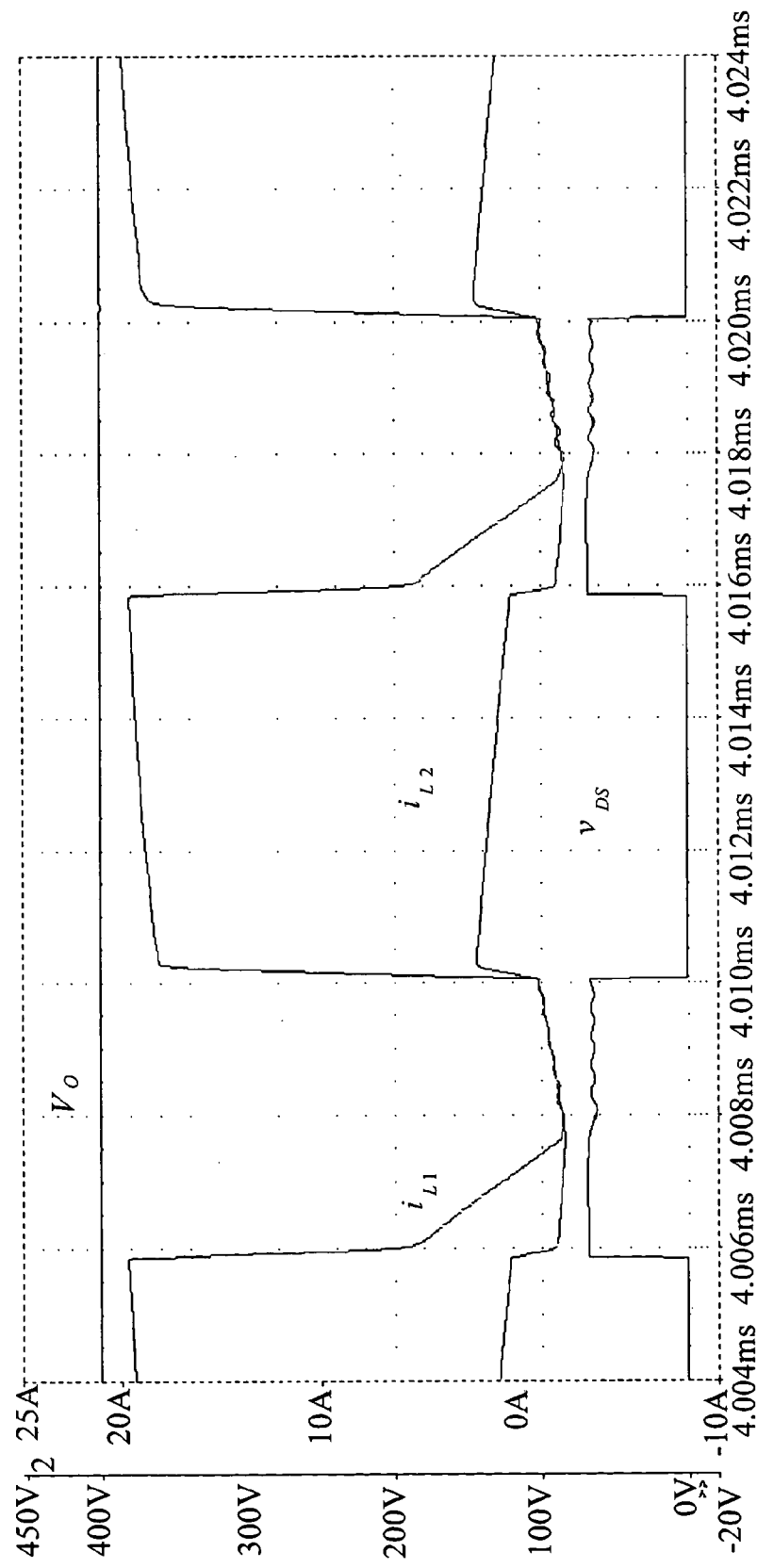

FIG. 18(*a*)–(*c*) are simulated waveform responses of forth preferred embodiment. The simulation condition is the same as in FIG. 6, and input voltage 28V, output specification is 400V–300 W. According to the waveforms showed, the clamping voltage $v_{DS}$ across semi-conductor power switch Q is raised to 67V, but the peak of the current $i_{DS}$ is apparently lowed. The reverse-recovery current problem is effectively dealt by the voltage $v_{D4}$ and current $i_{D4}$ waveforms of discharge diode $D_4$ of first passive regenerative snubber 1503. This simulation has proven that the circuit in FIG. 17 can strictly separate high voltage side current from low voltage side current.

Figure 19:
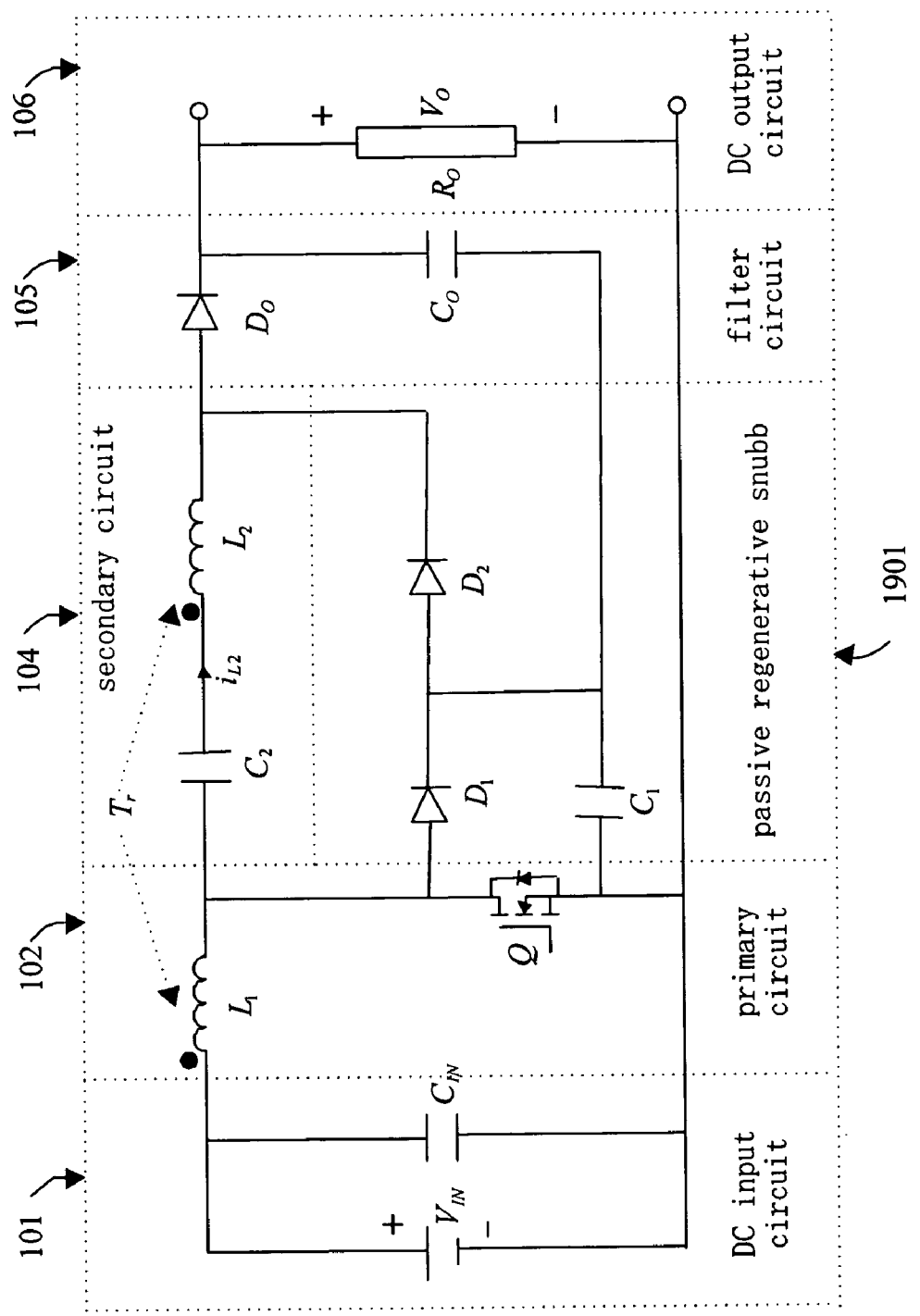
FIG. 19 is the diagram of the fifth preferred embodiment of the present invention.
Figure 20A:
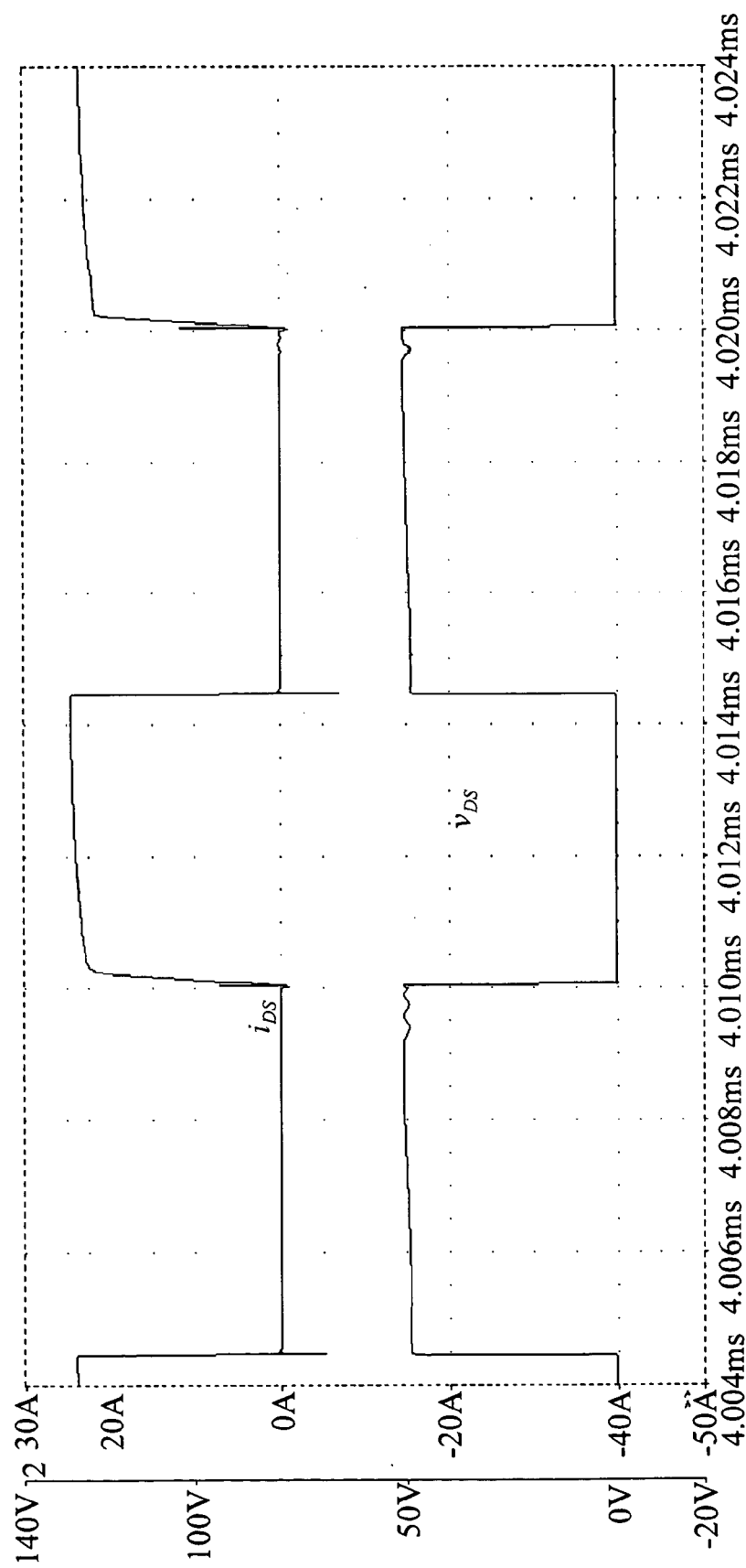
FIGS. 20(a)~(c) is the simulated wave responses of the fifth preferred embodiment of the present invention.
Figure 20B:
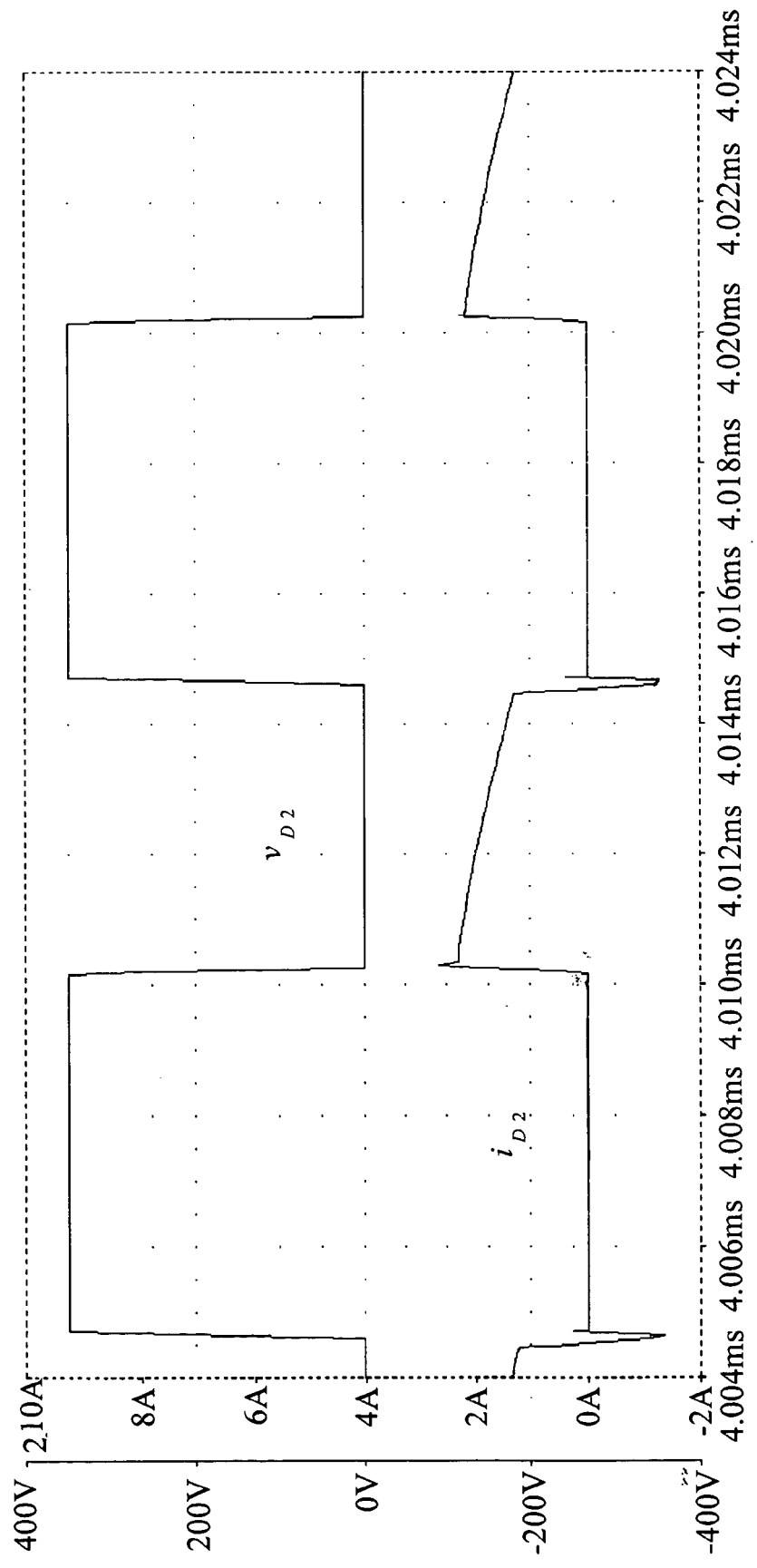
Figure 20C:
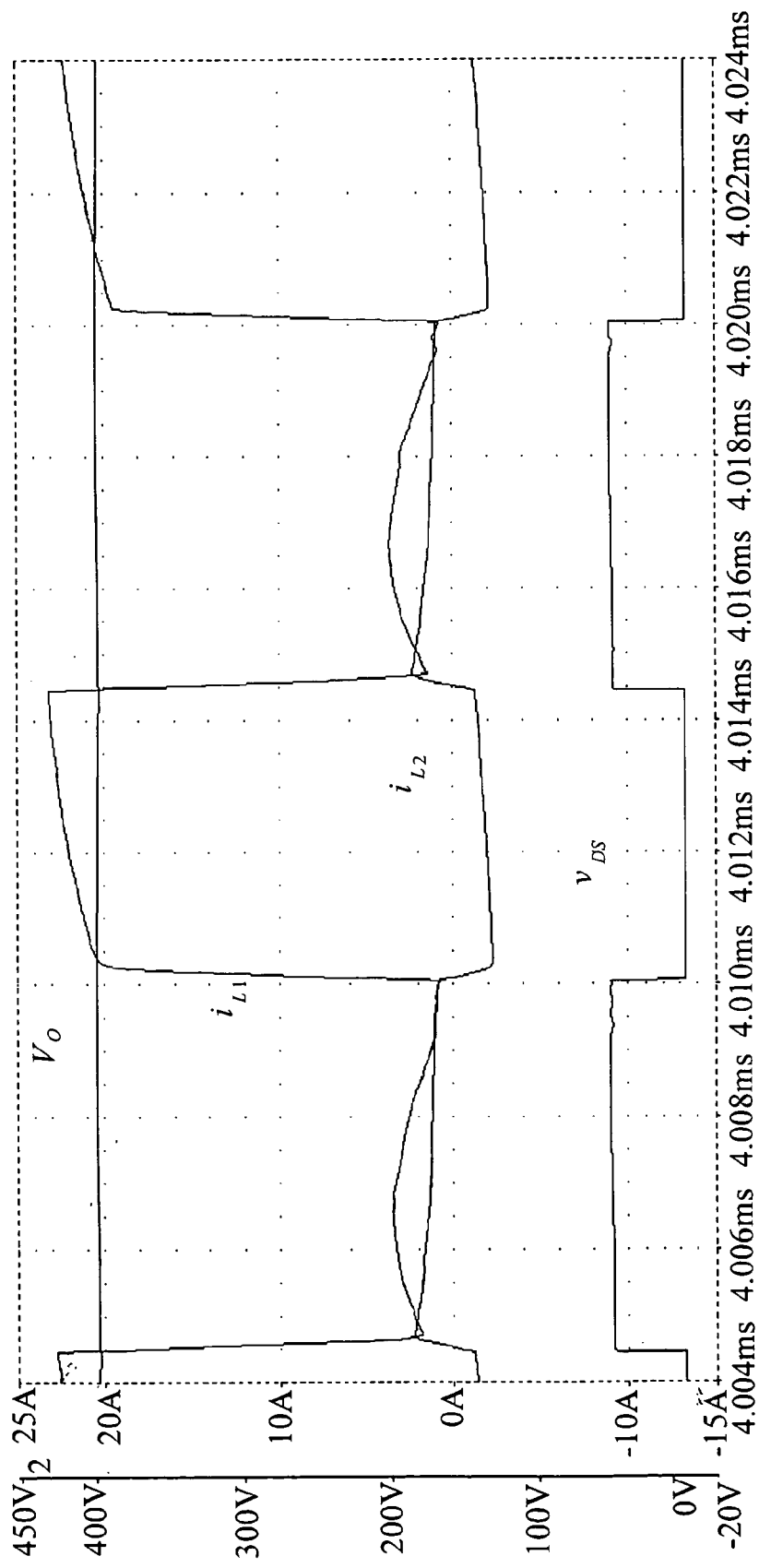

FIG. 19 is the diagram of forth preferred embodiment of the present invention. Its difference is that the passive regenerative snubber is replaced by serially connected passive regenerated snubber 1901. Because passive regenerated snubber is connected in series with filter circuit 105, it is called serially connected passive regenerated snubber 1901. The negative end of filter capacitor $C_O$ of filter circuit 105 does not connect to negative end of DC input circuit 101, instead, it connects to positive end of clamping capacitor $C_1$ of serially connected passive regenerated snubber 1901. The current embodiment not only has high boost rate and high efficiency of the first preferred embodiment, but also reduces the voltage exerted on filter capacitor $C_O$. The voltage of DC output circuit 106 consists of the voltage $v_{C1}$ of clamping capacitor $C_1$ of serially connected passive regenerated snubber 1901 and the voltage of filter capacitor $C_O$ of filter circuit 105. When the switch is turned off, the spike current $i_{L1}$ of primary winding $L_1$ of coupling inductor $T_r$ first charges the clamping capacitor $C_1$, and then after the direction for the current $i_{L2}$ of secondary winding $L_2$ of coupling inductor $T_r$ is reversed, it charge the clamping capacitor $C_1$ and filter capacitor $C_O$ at the same time.

The voltage gain equation is the same as the one of second preferred embodiment, its deduction is the same and is omitted here. Its function can be proven by following simulation.

Figure 21:
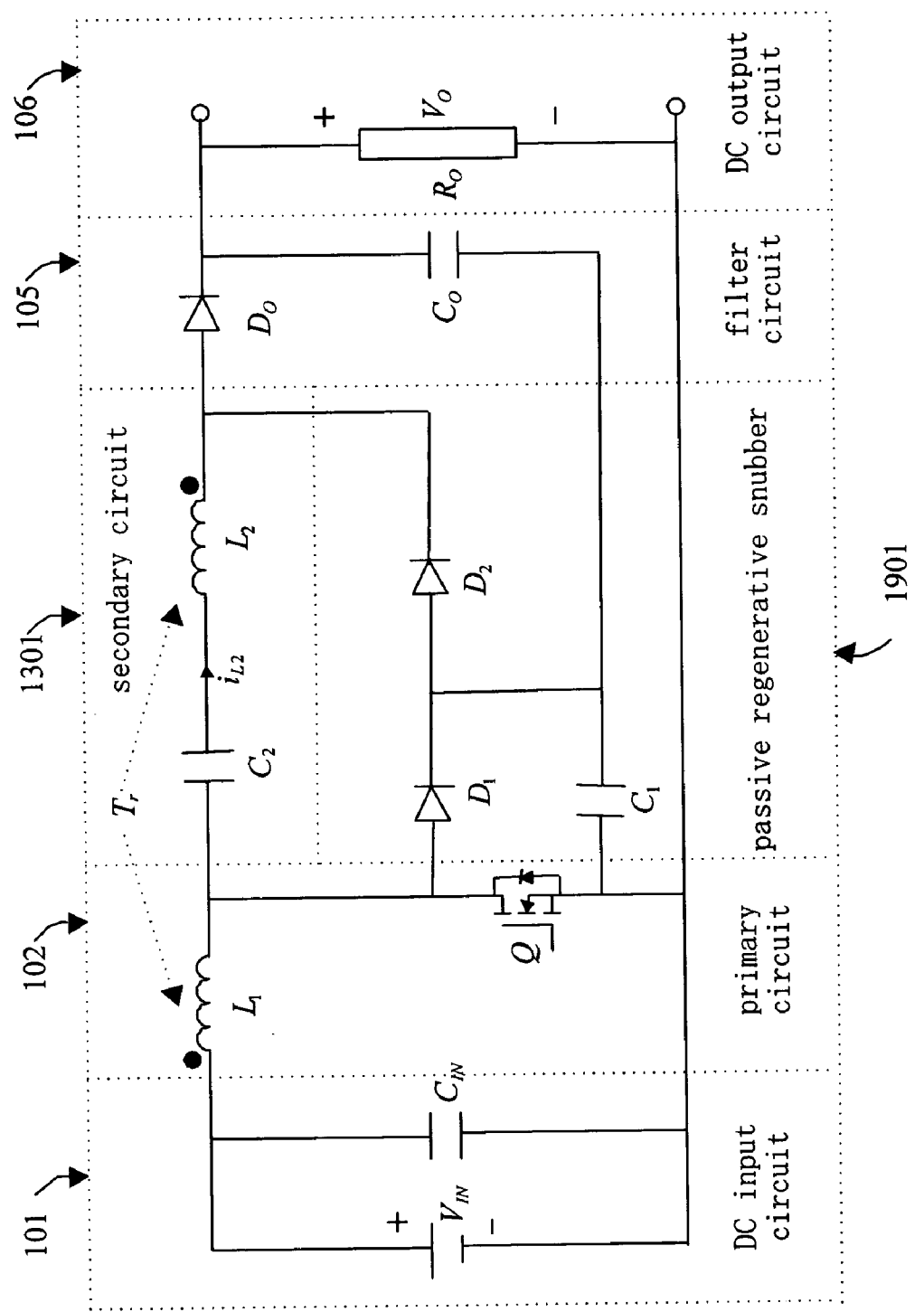
FIG. 21 is the diagram of the sixth preferred embodiment of the present invention.

FIG. 21 is the diagram of sixth preferred embodiment of the present invention. Comparing to the configuration in FIG. 19, the polar wiring of secondary winding $L_2$ of coupling inductor $T_r$ in secondary circuit 1301 is reversed, and its polar point is defined as the place connecting to filter circuit 105. The current embodiment not only has high boost rate and high efficiency of the first preferred embodiment, but also reduces the voltage exerted on filter capacitor $C_O$. The voltage of DC output circuit 106 consists of the voltage $v_{C1}$ of clamping capacitor $C_1$ of serially connected passive regenerated snubber 1901 and the voltage of filter capacitor $C_O$ of filter circuit 105. When the switch is turned off, the spike current $i_{L1}$ of primary winding $L_1$ of coupling inductor $T_r$ first charges the clamping capacitor $C_1$, and then waiting for next time when the switch Q is turned on, it charge the clamping capacitor $C_1$ and filter capacitor $C_O$ at the same time.

The voltage gain equation is the same as the one of second preferred embodiment, its deduction is the same and is omitted here. Its function can be proven by following simulation.

Figure 22A:
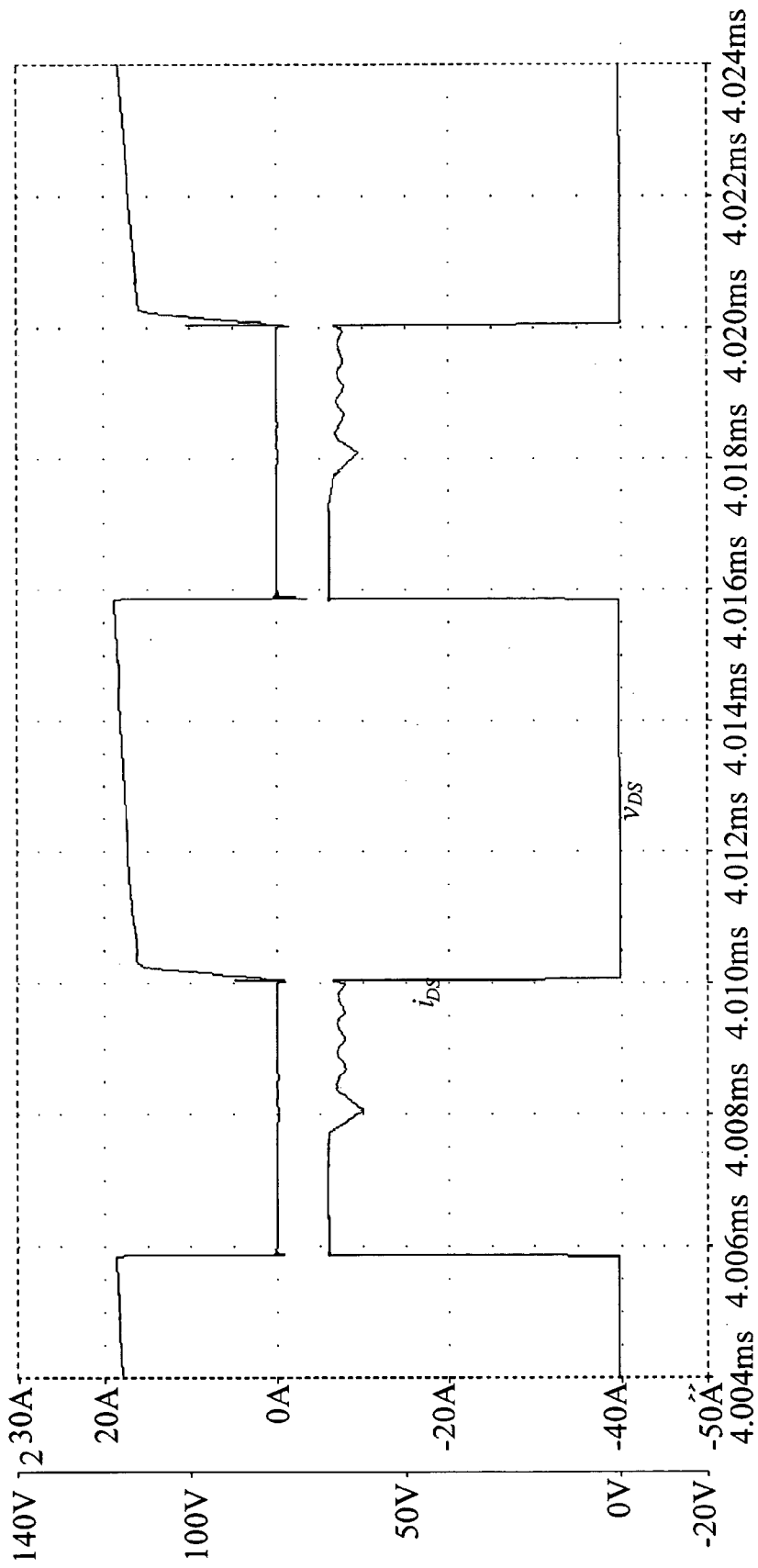
FIGS. 22(a)~(c) is the simulated wave responses of the sixth preferred embodiment of the present invention.
Figure 22B:
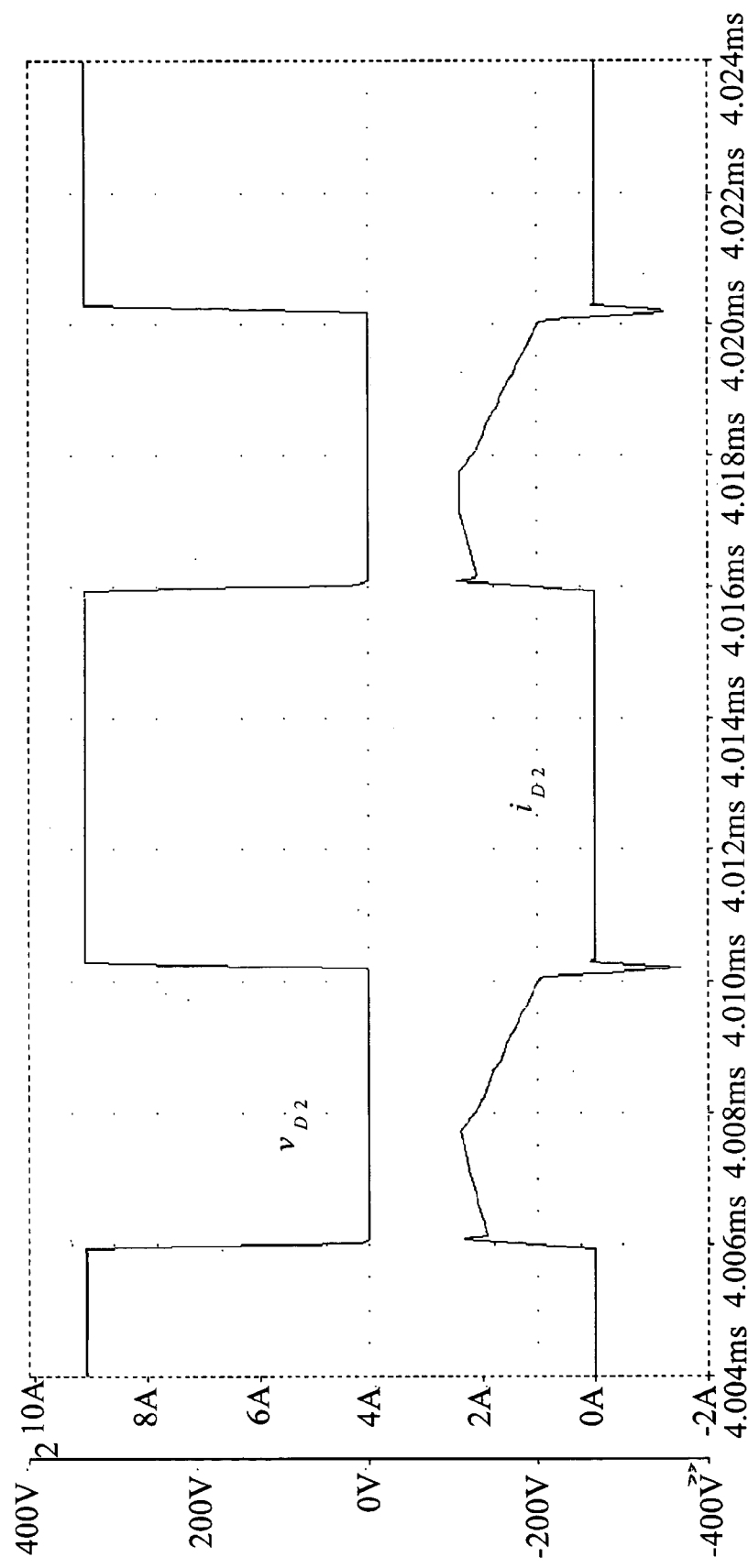
Figure 22C:
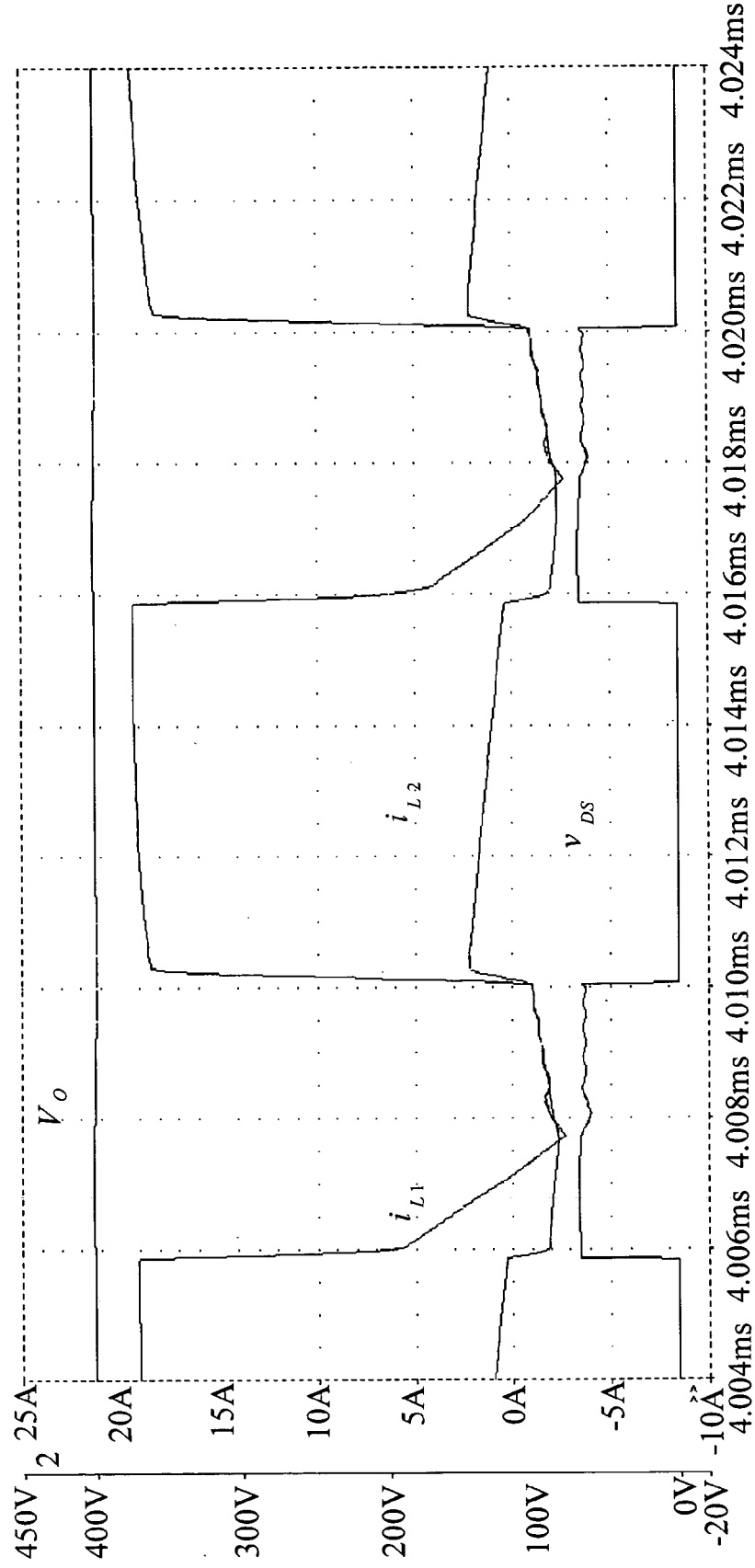

FIG. 22(*a*)–(*c*) are simulated waveform responses of sixth preferred embodiment. The current embodiment, through simulation, shows the same idea expressed in second and forth preferred embodiments, that is to have high boost rate and high efficiency.

The voltage gain and switch clamping voltage of above-mentioned six preferred embodiments are listed in following table:

| Embodiment | First and fifth preferred embodiments | Second, forth and sixth preferred embodiments |
|---|---|---|
| Voltage Gain | $G_v = V_O/V_{IN} = \dfrac{n+2}{1-D}$ | $G_v = V_O/V_{IN} = \dfrac{n}{1-D}$ |
| Switch clamping voltage | $v_{DS} = V_O/(n+2)$ | $v_{DS} = V_O/n$ |

If using first equation to design converter, setting output voltage 1 kV, turn ratio n to 10, duty cycle to 0.8, then voltage gain will be 60 times; in other words, 16.7 v voltage can be raise to about 1 kV; switch clamping is about 83.3V and 100 V or 150V withstand switch can be used; of course, reverse voltages of rectify diode and discharge diode are lower than DC output voltage, where 1 kV diode can be used; thus it eliminates the need for multiple serial winding and high voltage diode circuit which are commonly used in high voltage output.

The following is a table listing all high efficiency boost conversion technologies mentioned in the references, which are compared with the present invention side by side to further clarify the noteworthy improvement made by the present invention.

| Ref. | Input Voltage | Output Voltage | Output Capcity | Highest Conversion Rate | Voltage Gain and Times | Switch Spec. or Highest Peak of Waveforms | Comparison |
|---|---|---|---|---|---|---|---|
| Lu et al. | 100 V | 150 V | 200 W | 97.4% | 1.5 | 500 V/14 A | Pro.: Soft switching<br>Con.: low boost rate, large capacitor |
| Duarte et al. | 300 V | 400 V | 1.6 kW | 98.3% | 1.3 | 500 V/20 A | Pro.: Soft switching<br>Con.: Too low boost rate, high claming voltage |
| Silva et al. | 80 V | 200 V | 400 W | 97.5% | 2.5 | 400 V/10 A | Pro.: Soft switching<br>Con.: max. boost rate is 4 times |
| Zhao et al. | 48V \| 75V | 380 V | 1 kW | 92.3% (75 V–1 kW) | $G_v = \dfrac{1+nD}{1-D}$<br>8.0 | 250 V/14 A 4 in parallel | Pro.: Simple Conf., low conduction loss components used<br>Con.: Snubber is needed for diode |
| Tseng et al. | 12 V | 42 V | 35 W | 93% | $G_v = \dfrac{1+nD}{1-D}$<br>3.5 | 30 V | Pro.: low voltage withstand for diode<br>Con.: Snubber is needed for diode |
| Barbi et al. | 26 V \| 44 V | Single max. 750 V | 150 W | 94.7% | 28.8 | 200 V–100 A *2<br>250 V–23 A *2 | Pro.: Soft switching, high efficiency, high voltage gain ratio<br>Con.: High cost, complex config. |
| The present Invent. | 12 V \| 40 V | 400 V | 370 W | 97.8% (input 24 V) | $G_v = \dfrac{2+n}{1-D}$<br>33.0 | 80 V–71 A- I²PAK Voltage across the switch 55 V | |

What is claim is:

1. A boost converter utilizing bi-directional magnetic energy transfer of coupling inductor, comprising:
   a primary circuit including a semi-conductor power switch and a primary winding of a coupling inductor with a first polar point connecting to a positive end of a DC input circuit;
   a passive regenerative snubber including a clamping diode, a discharge diode and a clamping capacitor;
   a secondary circuit including a high voltage capacitor and a secondary winding of the coupling inductor with a second polar point connecting said high voltage capacitor; and
   a filter circuit including a filter capacitor and a rectify diode;
   wherein when said semi-conductor power switch is turned on, the current stores energy in said primary winding of said coupling inductor, the voltage at said second polar point of said secondary winding is positive; its voltage combined with the voltage of said clamping capacitor of said passive regenerative snubber, through said discharge diode of said passive regenerative snubber, charges said high voltage capacitor of said secondary circuit with a high voltage and a low current; when said semi-conductor power switch is turned off, said clamping capacitor of said passive regenerative snubber first, through said clamping diode of its circuit, absorbs leakage induction energy of said primary winding; when the current of said secondary winding of said coupling inductor is reversed in direction, and the voltage at the non polar point of said secondary winding of said coupling inductor is positive, and combined with other three voltages, including a positive voltage at the non polar point of said primary winding generated by a magnetic excited current of said primary winding, the DC input voltage and the voltage of said high voltage capacitor, together through said rectify diode charges said filter capacitor to maintain a stable DC output voltage;

the characteristics of the present design is that, first it has a high boost ratio with low winding ratio and lenient duty cycle control; second, passive regenerative snubber can absorbs circuit's induction energy, making it easier for wiring layout; third, the energy absorbed by the clamping capacitor can be applied to boost voltage, and there is no circular current problem and further achieving the purpose of voltage clamping; forth, all the switches and diodes can function in voltage clamping, and at the moment when switch is turned on there are no short current and high reverse-recovery current in diode; fifth, high conversion efficiency, under no separation configuration, proper specification of the components can be subscribed according to where they are being used, that is either for low voltage large current or for high voltage low current; sixth, simple configuration, comparing to traditional coupling inductor circuit, only two more diodes and capacitors are used but achieve much higher boost ratio with lower capacity requirements; seventh, conversion efficiency is directly related to boost ratio, but to the size of duty cycle and if the conducting current of the switch is square wave or not; this overcomes the bottle neck in traditional technique where the higher boost ratio is, the lower efficiency is; eighth, coupling inductor has the same feature as transformer, where once current flows at primary winding instant output current occurs at secondary winding; the coupling inductor functions as transformer and inductance, which dramatically reduces ripples of semi-conductor power switch and required exited inductance value, and also reduces iron core; ninth, since exited inductance is reduced the required number of primary winding becomes less; when large current passes the primary winding, the copper loss induced by skin effect is reduced; tenth, violent current change can be limited to primary circuit, making it easier to control magnetic interference; eleventh, during boosting process, DC power source provides current to output when the semi-conductor power switch is turned off; since this part of process does not pass the switch and magnetic transfer, conversion efficiency increases; twelfth, according to theoretical analysis and experiment, voltage withstand on semi-conductor power switch is only related to the output voltage and winding ratio of coupling inductor; this feature is well suited to power conversion equipments with large range of input power sources.

2. A boost converter of claim 1, wherein said semi-conductor power switch of primary circuit has a character of low conduction loss for low voltage and high current.

3. A boost converter of claim 1, wherein said coupling inductor of primary circuit and secondary circuit is a double winding transformer with high magnetic excited current and wide air gaps; by utilizing the different turn ratios of said transformer to control the range of voltages and currents, lower voltage side has less turns of winding and larger current, and higher voltage side is vise versa.

4. A boost converter of claim 1, wherein said passive regenerative snubber absorbs both circuit induction energy and the leakage induction energy of said primary winding of said coupling inductor; where the absorbed energy can be used to boost voltage, and when said semi-conductor switch is turned on, further provides a current passage for said coupling inductor of said secondary circuit; this is different from traditional coupling induction configuration and the key in providing bi-directional magnetic passage; and a higher leakage induction of said primary winding of said coupling inductor will reduces induction voltage of said secondary winding; by utilizing said passive regenerative snubber plus increased conducting time of said semi-conductor power switch, a constant output voltage can be maintained; thus, in the present design a transform with high induction leakage can be tolerated, and it is not limited to high coupling coefficient sandwich winding method where traditional two separated windings will fulfill the purpose.

5. A boost converter of claim 1, wherein said clamping diode of said passive regenerative snubber is further connects to said semi-conductor power switch and said clamping capacitor, which withstands the same voltage that said semi-conductor power switch withstands, therefore, a low voltage low conduction loss Schottky diode can be used.

6. A boost converter of claim 1, wherein said discharge diode of said passive regenerative snubber connects to said clamping capacitor and said filter circuit, when its reverse voltage is higher than the difference between the output voltage and the voltage of said clamping capacitor, said rectify diode of said filter circuit starts to conduct and withstands a lower voltage than the output voltage without additional snubber installed; normally, lower withstand diode's specification is, lower conducting voltage is, thus Schottky diode with low voltage low conducting loss can be used.

7. A boost converter of claim 1, wherein when reverse voltage of said rectify diode of said filter circuit is higher than the difference between the output voltage and the voltage of said clamping capacitor of said passive regenerative snubber, said discharge diode of said passive regenerative snubber starts to conduct and withstands a lower voltage than the output voltage without additional snubber; where said diode and discharge diode of said passive regenerative snubber compensate each other and function as voltage damper at the same time.

8. A boost converter utilizing bi-directional magnetic energy transfer of coupling inductor comprising:
   a primary circuit including a semi-conductor power switch and a primary winding of a coupling inductor having a first polar point defined as the place connecting to a positive end of a DC input circuit;
   a passive regenerative snubber including a clamping diode, a discharge diode and a clamping capacitor;
   a filter circuit including a filter capacitor and a rectify diode;
   a secondary circuit including a high voltage capacitor and a secondary winding of the coupling inductor having a second polar point defined as the place connecting said filter circuit;
   when said semi-conductor power switch of said primary circuit is turned on, the current stores energy in said primary winding of said coupling inductor, the voltage at said second polar point of said secondary winding is positive; its voltage combined with the voltage of said high voltage capacitor of said secondary circuit charges said filter capacitor of said filter circuit; when the semi-conductor power switch is turned off, the non polar point of said secondary winding of the coupling inductor has a positive voltage which, through said clamping diode and said discharge diode of said passive regenerative snubber, charges said high voltage capacitor, at the same time, the leakage induction current of said primary winding of said coupling inductor, through said clamping diode, charges said clamping capacitor of said passive regenerative snubber; when the voltage of said clamping capacitor rises above the voltage of said semi-conductor power switch, the current of a reverse bias of said clamping diode stops and the voltage of said clamping capacitor discharges to said high voltage capacitor of said secondary circuit through said discharge diode;
   the characteristic of the present design is that the voltage of said high voltage capacitor of said secondary circuit comes exclusively from said secondary winding of said coupling inductor, and the DC input voltage and the voltage of said primary winding do not charge to said filter circuit in series; hence it has a low voltage boost ratio, high clamping voltage; however, after increasing duty cycle to maintain fixed output voltage, effective current of said semi-conductor power switch can be reduced, that is, the switching loss and the current withstood can be reduced; in addition, it has high boosting ratio, easy wiring layout and the energy absorbed by the capacitor of the passive regenerative snubber can be applied to boost voltage, all the switches and diodes achieve clamping function, high conversion rate, simple configuration, efficiency is not directly related to boosting ratio, small induction spike, induction interference is easy dealt with and suitable to large range of input voltage.

9. A boost converter of claim 8, wherein said semi-conductor power switch of said primary circuit has a characteristic of low conduction loss for low voltage and high current.

10. A boost converter of claim 8, wherein said coupling inductor is a double winding transformer with high magnetic excited current and wide air gaps, by utilizing the different turn ratios of said transformer to coordinate voltages and currents, such that a low voltage side has less turns of winding and large current, and a high voltage side is vise versa.

11. A boost converter of claim 8, wherein said passive regenerative snubber can absorb both circuit induction energy and the leakage induction energy of said primary winding of said coupling inductor, where the absorbed energy can be used to boost voltage; when said semi-conductor switch is turned on, it further provides a current passage for said coupling inductor of said secondary circuit; this is different from traditional coupling induction configuration and the key in providing bi-directional magnetic passage; and a higher leakage induction of said primary winding of said coupling inductor will reduces the induction voltage of said secondary winding; by using said passive regenerative snubber and increasing conducting time of said semi-conductor power switch, a constant output voltage can be maintained; thus, in the present design a transformer with high induction leakage can be tolerated, and it is not limited to high coupling coefficient sandwich winding method while traditional two separated windings will fulfill the purpose.

12. A boost converter of claim 8, wherein said clamping diode of said passive regenerative snubber connects to said semi-conductor power switch and said clamping capacitor, which withstands the same voltage that said semi-conductor power switch withstands; therefore, a low voltage low conduction loss Schottky diode can be used.

13. A boost converter of claim 8, wherein said discharge diode of said passive regenerative snubber connects to said clamping capacitor and said filter circuit, when its reverse voltage is higher than the difference between the output voltage and the voltage of said clamping capacitor, said rectify diode of said filter circuit starts to conduct and withstands a lower voltage than the output voltage without additional snubber installed; normally, lower withstand diode's specification is, lower conducting voltage is.

14. A boost converter of claim 8, wherein when reverse voltage of said rectify diode of said filter circuit is higher than the difference between the output voltage and the voltage of said clamping capacitor of said passive regenerative snubber, said discharge diode of said passive regenerative snubber starts to conduct and withstands a lower voltage than the output voltage without additional snubber installed; where said diode and discharge diode of said passive regenerative snubber compensate each other, and avoiding the problem of reverse-recovery current of the diode too high.

15. A boost converter utilizing bi-directional magnetic energy transfer of coupling inductor comprising:
  a primary circuit including a semi-conductor power switch and a primary winding of a coupling inductor having a first polar point defined as the place connecting to a positive end of a DC input circuit;
  a first passive regenerative snubber including a clamping diode, a discharge diode and a clamping capacitor;
  a secondary circuit including a high voltage capacitor and a secondary winding of the coupling inductor having a second polar point defined as the place connecting said high voltage capacitor;
  a filter circuit including a filter capacitor and a rectify diode;
  when said semi-conductor power switch of said primary circuit is turned on, the current stores the energy in said primary winding of said coupling capacitor and the voltage of said polar point of said secondary winding of said coupling inductor is positive; its voltage combined with the voltage of said clamping capacitor of said first passive regenerative snubber in series, through said discharging diode of said first passive regenerative snubber, charges the high voltage capacitor of said secondary circuit by high voltage and low current; when said semi-conductor power switch is turned off, said clamping capacitor of said first passive regenerative snubber, through its clamping diode, first absorbs the leakage induction energy of said primary winding of said coupling inductor; when the current of said secondary winding of said coupling inductor reverses in direction, the voltage of its non polar point is positive, combined with the positive voltage at the non polar point of said primary winding generated by a magnetic excited current of said primary winding, the DC input voltage and the voltage of said high voltage capacitor of said secondary circuit together, through said rectify diode of said filter circuit, charges said filter capacitor to maintain a stable DC output voltage;

the characteristic of the design is that the primary winding directly absorbs the spike current and then, when the switch is turned on, it uses this energy to charge the high voltage capacitor of the secondary circuit; in addition, it has high boosting ratio, easy wiring layout and the energy absorbed by the capacitor of the passive regenerative snubber can be applied to boost voltage, all the switches and diodes achieve clamping function, high conversion rate, simple configuration, efficiency is not directly related to boosting ratio, small induction spike, induction interference is easy dealt with and suitable to large range of input voltage.

16. A boost converter of claim 15, wherein a second passive regenerative snubber is added to absorb current spike evenly and boost voltage by regenerative method; said second passive regenerative snubber comprising a clamping diode, a discharge diode and a clamping capacitor, working as the same as said first passive regenerative snubber.

17. A boost converter of claim 15, wherein said semi-conductor power switch of said primary circuit has a characteristic of low conduction loss for low voltage and high current.

18. A boost converter of claim 15, wherein said coupling inductor is a double winding transformer with high magnetic excited current and wide air gaps; by utilizing said different turn ratios of said transformer to control the range of voltages and currents, where a lower voltage side has less turns of winding and larger current, and a higher voltage side is vise versa.

19. A boost converter of claim 15, wherein said passive regenerative snubber can absorb circuit induction energy and the leakage induction energy of said primary winding of said coupling inductor, where the absorbed energy can be used to boost voltage; when said semi-conductor switch is turned on, it further provides a current passage for said coupling inductor of said secondary circuit, where a higher leakage induction of said primary winding of said coupling inductor will reduces the induction voltage of said secondary winding; by using said passive regenerative snubber and increasing conducting time of the semi-conductor power switch a constant output voltage can be maintained; thus, in the present design a transformer with high induction leakage can be tolerated, and it is not limited to high coupling coefficient sandwich winding method while traditional two separated windings will fulfill the purpose.

20. A boost converter of claim 15, wherein said clamping diode of said passive regenerative snubber connects to said semi-conductor power switch and said clamping capacitor to withstand the same voltage that said semi-conductor power switch withstands; therefore, a low voltage low conduction loss Schottky diode can be used.

21. A boost converter of claim 15, wherein said discharge diode of said passive regenerative snubber connects to said clamping capacitor and said filter circuit; when the reverse voltage is higher than the difference between the output voltage and the voltage of said clamping capacitor, said rectify diode of said filter circuit starts to conduct and withstand a lower voltage than the output voltage without additional snubber installed; normally, the lower withstand a diode has, the lower turn-on voltage is.

22. A boost converter of claim 8, wherein when the reverse voltage of said rectify diode of said filter circuit is higher than the difference between the output voltage and the voltage of said clamping capacitor of said passive regenerative snubber, said discharge diode of said first passive regenerative snubber starts to conduct and withstand a lower voltage than output voltage without additional snubber installed, where this diode and the discharge diode of said passive regenerative snubber compensate each other and function as voltage clamper to avoid the problem of reverse-recovery current of the diode too high.

23. A boost converter utilizing bi-directional magnetic energy transfer of coupling inductor comprising:
   a primary circuit including a semi-conductor power switch and a primary winding of a coupling inductor having a first polar point defined as the place connecting to the positive end of a DC input circuit;
   a first passive regenerative snubber including a clamping diode, a discharge diode and a clamping capacitor;
   a filter circuit including a filter capacitor and a rectify diode;
   a secondary circuit including a high voltage capacitor and a secondary winding of the coupling inductor having a second polar point defined as the place connecting said filter circuit;
   when said semi-conductor power switch of said primary circuit is turned on, the current stores the energy in said primary winding of said coupling capacitor and the voltage of said polar point of said secondary winding of said coupling inductor is positive, and the voltage of said secondary winding combined with the voltage of said high voltage capacitor of said secondary winding charges said filter capacitor of said filter circuit; when said semi-conductor power switch is turned off, the voltage at the non polar point of said secondary winding is positive, and this voltage charges said high voltage capacitor through said clamping diode and said discharging diode of said first passive regenerative snubber; at the same time, the leakage induction current of said primary winding of said coupling inductor charges said clamping capacitor of said first passive regenerative snubber through said clamping diode; when the voltage at the positive end of said clamping capacitor rises above the voltage of said semi-conductor power switch, the reverse bias of said clamping diode stops and the voltage of said clamping capacitor charges said high voltage capacitor of said secondary circuit through said discharging diode;
   the characteristic of the present design is that the voltage of said high voltage capacitor of said secondary circuit comes exclusively from said secondary winding of said coupling inductor, and the DC input voltage and the voltage of said primary winding cancel each other and do not charge to the filter circuit in series; hence it has a low voltage boost ratio, high clamping voltage; however, after increasing duty cycle to maintain fixed output voltage, effective current of said semi-conductor power switch can be reduced, that is, the switching loss and the current withstood can be reduced; in addition, it has high boosting ratio, easy wiring layout and the energy absorbed by the capacitor of the passive regenerative snubber can be applied to boost voltage, all the switches and diodes achieve clamping function, high conversion rate, simple configuration, efficiency is not directly related to boosting ratio, small induction spike, induction interference is easy dealt with and suitable to large range of input voltage.

24. A boost converter of claim 23, wherein a second passive regenerative snubber is added to absorb current spike evenly and boost voltage by regenerative method; said second passive regenerative snubber comprising a clamping diode, a discharge diode and a clamping capacitor, working as the same as said first passive regenerative snubber.

25. A boost converter of claim 23, wherein said semi-conductor power switch of said primary circuit has a characteristic of low conduction loss for low voltage and high current.

26. A boost converter of claim 23, wherein said coupling inductor is a double winding transformer with high magnetic excited current and wide air gaps; by utilizing said different turn ratios of said transformer to control the range of voltages and currents, where a lower voltage side has less turns of winding and larger current, and a higher voltage side is vise versa.

27. A boost converter of claim 23, wherein said first passive regenerative snubber can absorb circuit induction energy and the leakage induction energy of said primary winding of said coupling inductor, where the absorbed energy can be used to boost voltage; and when said semi-conductor switch is turned on, it further provides a current passage for the coupling inductor of secondary circuit; this is different from traditional coupling induction configuration and the key in providing bi-directional magnetic passage; and a higher leakage induction of said primary winding of said coupling inductor will reduces the induction voltage of said secondary winding; by using said first passive regenerative snubber and increasing conducting time of said semi-conductor power switch, a constant output voltage can be maintained; thus, in the present design a transformer with high induction leakage can be tolerated, and it is not limited to high coupling coefficient sandwich winding method where traditional two separated windings will fulfill the purpose.

28. A boost converter of claim 23, wherein said clamping diode of said first passive regenerative snubber connects to said semi-conductor power switch and said clamping capacitor to withstand the same voltage that said semi-conductor power switch withstands; hence, a low voltage low conduction loss Schottky diode can be used.

29. A boost converter of claim 23, wherein said discharge diode of said first passive regenerative snubber connects to said clamping capacitor and said filter circuit; when the reverse voltage is higher than the difference between the output voltage and the voltage of said clamping capacitor, said rectify diode of said filter circuit starts to conduct and withstands a lower voltage than the output voltage without additional snubber installed; normally, the lower withstand a diode has, the lower turn-on voltage is.

30. A boost converter of claim 23, wherein when the reverse voltage of said rectify diode of said filter circuit is higher than the difference between the DC output voltage and the voltage of said clamping capacitor of said first passive regenerative snubber, said discharge diode of said first passive regenerative snubber starts to conduct and withstands a lower voltage than output voltage without additional snubber installed; this diode and said discharge diode of said passive regenerative snubber compensate each other and avoiding the problem of reverse-recovery current of the diode too high.

31. A boost converter utilizing bi-directional magnetic energy transfer of coupling inductor comprising:
   a primary circuit including a semi-conductor power switch and a primary winding of a coupling inductor having a first polar point defined as the place connecting to the positive end of a DC input circuit;
   a serially connected passive regenerative snubber including a clamping diode, a discharge diode and a clamping capacitor;
   a secondary circuit including a high voltage capacitor and a secondary winding of the coupling inductor having a second polar point defined as the place connecting said high voltage capacitor;
   a filter circuit including a filter capacitor and a rectify diode; the negative of the filter capacitor connects to the positive of said clamp capacitor of said serially connected passive regenerative snubber;
   when said semi-conductor power switch of said primary circuit is turned on, the current stores the energy in said primary winding of said coupling capacitor and the voltage of said polar point of said secondary winding of said coupling inductor is positive; the voltage of said secondary winding combined with the voltage of said high voltage capacitor of said serially connected passive regenerative snubber charges said high voltage capacitor of said secondary winding with high voltage and low current through said discharge diode of said serially connected passive regenerative snubber; when said semi-conductor power switch is turned off, said clamp capacitor of said serially connected passive regenerative snubber first, through its clamp diode, absorbs the leakage induction energy of said primary winding of said coupling inductor; then, when the current of said secondary winding of said coupling inductor reverses, in which the non polar point of said secondary winding is positive, this voltage combined with the positive voltage at said non polar point of said primary winding generated by a magnetic excited current of the primary winding, the DC input voltage and the voltage of said high voltage capacitor of said secondary circuit together, through said rectify diode of said filter circuit, charges said filter capacitor to maintain a stable DC output voltage;
   the characteristic of the current design is that said filter capacitor of said filter circuit and said clamp capacitor of said serially connected passive regenerative snubber are connected in serial and together provide DC output; therefore, the voltage of said filter capacitor is lower than the output DC voltage, and a capacitor with lower voltage withstand can be used; in addition, it has high boosting ratio, easy wiring layout and the energy absorbed by the capacitor of said passive regenerative snubber can be applied to boost voltage, all the switches and diodes achieve clamping function, high conversion rate, simple configuration, efficiency is not directly related to boosting ratio, small induction spike, induction interference is easy dealt with and suitable to large range of input voltage.

32. A boost converter of claim 31, wherein said semi-conductor power switch of said primary circuit has a characteristic of low conduction loss for low voltage and high current.

33. A boost converter of claim 32, wherein said coupling inductor is a double winding transformer with high magnetic excited current and wide air gaps; by utilizing the different turn ratios of said transformer to control the range of voltages and currents, where a lower voltage side has less turns of winding and larger current, and a higher voltage side is vise versa.

34. A boost converter of claim 31, wherein said serially connected passive regenerative snubber can absorb both circuit induction energy and the leakage induction energy of said primary winding of said coupling inductor, where the absorbed energy can be used to boost voltage; and when said semi-conductor switch is turned on, it further provides a current passage for said coupling inductor of said secondary circuit; this is different from traditional coupling induction configuration and the key in providing bi-directional magnetic passage; and a higher leakage induction of said primary winding of said coupling inductor will reduces the induction voltage of said secondary winding; by using the first passive regenerative snubber and increasing conducting time of the semi-conductor power switch, a constant output voltage can be maintained; thus, in the present design a transformer with high induction leakage can be tolerated, and it is not limited to high coupling coefficient sandwich winding method while traditional two separated windings will fulfill the purpose.

35. A boost converter of claim 31, wherein the clamping diode of said serially connected passive regenerative snubber further connects to said semi-conductor power switch and said clamping capacitor to withstand the same voltage that said semi-conductor power switch withstands; hence, a low voltage low conduction loss Schottky diode can be used.

36. A boost converter of claim 31, wherein said discharge diode of said serially connected passive regenerative snubber connects to said clamping capacitor and said filter circuit; when its reverse voltage is higher than the difference between the output voltage and the voltage of said clamping capacitor, said rectify diode of said filter circuit starts to conduct and therefore it withstands a lower voltage than output voltage without additional snubber installed; normally, the lower withstand a diode has, the lower turn-on voltage is; a low voltage low conduction loss Schottky diode can be used.

37. A boost converter of claim 31, wherein when the reverse voltage of said rectify diode of said filter circuit is higher than the difference between the DC output voltage and the voltage of said clamping capacitor of said serially connected passive regenerative snubber, said discharge diode of said first passive regenerative snubber starts to conduct; and therefore it withstands a lower voltage than the output voltage without additional snubber installed; said diode and said discharge diode of said passive regenerative snubber compensate each other and avoid the problem of reverse-recovery current of the diode too high, and at the same time function as voltage clamp.

38. A boost converter utilizing bi-directional magnetic energy transfer of coupling inductor comprising:
   a primary circuit including a semi-conductor power switch and a primary winding of a coupling inductor having a first polar point defined as the place connecting to the positive end of a DC input circuit;

a serially connected passive regenerative snubber including a clamping diode, a discharge diode and a clamping capacitor;

a secondary circuit including a high voltage capacitor and a secondary winding of the coupling inductor having a second polar point defined as the place connecting said filter capacitor;

a filter circuit including a filter capacitor and a rectify diode; the negative of the filter capacitor connects to the positive of said clamp capacitor of said serially connected passive regenerative snubber;

when said semi-conductor power switch of said primary circuit is turned on, the current stores the energy in said primary winding of said coupling capacitor and the voltage of said polar point of said secondary winding of said coupling inductor is positive; the voltage of said secondary winding combined with the voltage of said high voltage capacitor of said secondary circuit charges said filter capacitor of said filter circuit; when said semi-conductor power switch is turned off, the non polar point of said secondary winding of said coupling inductor is positive, its voltage charges said high voltage capacitor through said clamping diode and said discharging diode of said serially connected passive regenerative snubber; at the same time the leakage induction current of said primary winding of said coupling inductor charges said clamping capacitor of said serially connected passive regenerative snubber through said clamping diode, and when the voltage of said clamping capacitor rises above the voltage of said semi-conductor power switch, the reverse bias on the clamping diode stops and the voltage of said clamping capacitor discharges to said high voltage capacitor of said secondary circuit through the passage of said discharging diode;

the characteristic of the current design is that said filter capacitor of said filter circuit and said clamping capacitor of said serially connected passive regenerative snubber are connected in serial and together provide the DC output; therefore, the voltage of said filter capacitor is lower than the output DC voltage, and a capacitor with lower voltage withstand can be used; the voltage of said high voltage capacitor of said secondary circuit comes exclusively from said secondary winding of the coupling inductor, and the DC input voltage and the voltage of said primary winding do not charge to said filter circuit in series; hence it has a low voltage boost ratio, high clamping voltage; however, after increasing duty cycle to maintain a fixed output voltage, effective current of said semi-conductor power switch can be reduced, that is, the switching loss and the current withstood can be reduced; in addition, it has high boosting ratio, easy wiring layout and the energy absorbed by the capacitor of the passive regenerative snubber can be applied to boost voltage, all the switches and diodes achieve clamping function, high conversion rate, simple configuration, efficiency is not directly related to boosting ratio, small induction spike, induction interference is easy dealt with and suitable to large range of input voltage.

39. A boost converter of claim 38, wherein said semi-conductor power switch of said primary circuit has a characteristic of low conduction loss for low voltage and high current.

40. A boost converter of claim 38, wherein said coupling inductor is a double winding transformer with high magnetic excited current and wide air gaps; by utilizing the different turn ratios of said transformer to coordinate voltages and currents, such that a low voltage side has less turns of winding and large current, and a high voltage side is vise versa.

41. A boost converter of claim 38, wherein said serially connected passive regenerative snubber not only can absorb circuit induction energy and but also the leakage induction energy of said primary winding of said coupling inductor, where the absorbed energy can be used to boost voltage, and it further provides a current passage for said coupling inductor of said secondary circuit when said semi-conductor switch is turned on; this is different from traditional coupling induction configuration and the key in providing bi-directional magnetic passage; and a higher leakage induction of said primary winding of said coupling inductor will reduces the induction voltage of said secondary winding; by utilizing said passive regenerative snubber plus increased conducting time of said semi-conductor power switch, a constant output voltage can be maintained; thus, in the present design a transformer with high induction leakage can be tolerated, and it is not limited to high coupling coefficient sandwich winding method where traditional two separated windings will fulfill the purpose.

42. A boost converter of claim 38, wherein said clamping diode of said serially connected passive regenerative snubber connects to said semi-conductor power switch and said clamping capacitor to withstand the same voltage that said semi-conductor power switch withstands; hence a low voltage low conduction loss Schottky diode can be used.

43. A boost converter of claim 31, wherein said discharge diode of said serially connected passive regenerative snubber connects to said clamping capacitor and said filter circuit; when its reverse voltage is higher than the difference between the output voltage and the voltage of said clamping capacitor, said rectify diode of said filter circuit starts to conduct and therefore it withstands a lower voltage than the output voltage without additional snubber installed; normally, the lower withstand a diode has, the lower turn-on voltage is.

44. A boost converter of claim 38, wherein when the reverse voltage of said rectify diode of said filter circuit is higher than the difference between the DC output voltage and the voltage of said clamping capacitor of said serially connected passive regenerative snubber, said discharge diode of said first passive regenerative snubber starts to conduct; and therefore it withstands a lower voltage than the output voltage without additional snubber installed; said diode and said discharge diode of said passive regenerative snubber compensate each other and avoid the problem of reverse-recovery current of the diode too high.

\* \* \* \* \*